United States Patent
Huang et al.

(10) Patent No.: US 9,171,197 B2
(45) Date of Patent: Oct. 27, 2015

(54) FACIAL TRACKING METHOD

(71) Applicant: Primax Electronics Ltd., Neihu, Taipei (TW)

(72) Inventors: Ying-Jieh Huang, Taipei (TW); Xu-Hua Liu, Taipei (TW); Qian-Wen Jia, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 342 days.

(21) Appl. No.: 13/831,397

(22) Filed: Mar. 14, 2013

(65) Prior Publication Data

US 2014/0086450 A1  Mar. 27, 2014

(30) Foreign Application Priority Data

Sep. 24, 2012  (CN) .......................... 2012 1 0357801

(51) Int. Cl.
*G06K 9/00* (2006.01)

(52) U.S. Cl.
CPC ........ *G06K 9/00261* (2013.01); *G06K 9/00295* (2013.01)

(58) Field of Classification Search
None
See application file for complete search history.

(56) References Cited

U.S. PATENT DOCUMENTS

| | | | |
|---|---|---|---|
| 2009/0169067 A1* | 7/2009 | Chang et al. | 382/118 |
| 2011/0135153 A1* | 6/2011 | Tsurumi et al. | 382/103 |
| 2012/0114173 A1* | 5/2012 | Ikenoue | 382/103 |
| 2013/0148898 A1* | 6/2013 | Mitura et al. | 382/195 |

* cited by examiner

*Primary Examiner* — Bhavesh Mehta
*Assistant Examiner* — Oneal R Mistry
(74) *Attorney, Agent, or Firm* — Kirton McConkie; Evan R. Witt

(57) ABSTRACT

A facial tracking method for detecting and tracking at least one face image in a region during a time period. The facial tracking method includes a step of performing an image acquiring operation, a step of performing a facial detecting operation to detect whether there is any face image in the entire of a current photo image, and at least one step of performing a facial tracking operation. For performing the facial tracking operation, plural tracking frames are located around a face image of the current photo image, and a similarity between the face image of the current photo image and the image included in each tracking frame in order to judge whether the face image exists in the next photo image. By the facial tracking method of the present invention, the time period of tracking face images is largely reduced.

20 Claims, 19 Drawing Sheets

FACIAL TRACKING METHOD

FIELD OF THE INVENTION

The present invention generally relates to a facial tracking method, and more particularly to a method of tracking plural face images in the same region.

BACKGROUND OF THE INVENTION

Generally, the beneficial results of playing television commercials or television series may be realized by gathering statistics about audience ratings. Recently, a variety of digital signages are widely used. However, no unified and efficient system has been developed to gather statistics about the beneficial results of playing advertisements. It is very important for the advertisers to select and play different advertisements and assess the audience concerns on the advertisements according to the audience feedback. Consequently, many researchers make efforts in the development of the technology of counting the number of persons in front of the digital signage. A known method of counting the number of persons will be described in more details as follows.

FIG. 1 is a flowchart illustrating a conventional method of counting and tracking the number of persons. Firstly, in the step 110, a database is provided. At least one personage message is recorded in the database. In addition, each personage message indicates the position, the physical feature and the residence time of a corresponding tracked person at the tracking time. Then, in the step 120, a personage region for detecting a person is acquired from an input image. After the input image is obtained, any computer vision technology such as an open source computer vision library (OpenCV) may be utilized to search the input image to detect whether there is any feature of a rectangular frame (e.g. a Haar-like feature). In addition, any applicable algorithm (e.g. an Adaboost algorithm) may be utilized to obtain candidate regions for detecting a person. After the improper candidate regions are deleted, the colors of all candidate regions are obtained. By judging whether the colors are skin color, the personage region is acquired. Then, in the step 130, the current position and the current physical feature of the personage region are extracted. Then, in the step 140, the current position and the current physical feature of the detected person corresponding to the personage region are compared with each personage message of the database in order to judge whether the detected person is any tracked person.

Hereinafter, a method of judging whether the detected person is any tracked person according to the similarity will be illustrated in more details. Firstly, a personage message is acquired from the database. Then, a facial texture similarity and a body texture similarity of the current physical feature of the detected person relative to the acquired personage message are calculated. In addition, the displacement amount of the current position of the detected person relative to the acquired personage message should be calculated. Afterwards, the similarity between the detected person and the acquired personage message is calculated according to the facial texture similarity, the body texture similarity and the displacement amount. After each personage message is acquired from the database, the above steps may be repeatedly performed to calculate plural similarities between all personage messages and the detected person.

If the value of the highest similarity among the plural similarities is higher than a first threshold value, the detected person may be considered as the tracked person with the highest similarity. Then, in the step 150, the personage message of the tracked person in the database is updated according to the current position and the current physical feature of the detected person.

On other hand, if all of the calculated similarities are lower than a second threshold value in the step 140, it is considered that the detected person does not comply with all tracked persons. Then, the step 160 is performed. Consequently, a new personage message corresponding to the detected person is added to the database in order to record the detected person as a new tracked person.

If the capacity of the database reaches a critical capacity when the personage message is added to the database, the latest update time of each personage message in the database is firstly acquired, and then the personage message which has not been updated for the longest time is deleted from the database.

Afterwards, the number of persons is calculated according to the residence time of each tracked person in the database (Step 170).

From the above discussions about the conventional method of calculating and tracking the number of persons, a personage region for detecting a person is firstly acquired from an input image, and then each detected person is successively compared with all tracked persons in the database in order to judge whether the detected person is any tracked person. Consequently, the purpose of calculating and tracking the number of persons is achieved.

However, the conventional method still has some drawbacks. For example, it is time-consuming to detect the face image from each input image. After the detected person is acquired from each input image, each detected person is successively compared with all tracked persons in the database. If there are abundant personage messages contained in the database, the overall processing time is increased. In other words, the processing time of the conventional method is very long. Under this circumstance, since a high performance processing device is needed to implement the lengthy and massive computing process, the conventional method fails to meet the requirement of many users.

Moreover, according to the conventional method, if the capacity of the database reaches the critical capacity, the personage message which has not been updated for the longest time is deleted from the database. In other words, some personage messages are lost after the tracking process is ended. Consequently, the accuracy of the tracking result is impaired. For overcoming these problems, the data may be processed in batches in order to avoid losing the personage messages because of too many personage messages. However, the processing time is extended, and the processing complexity is increased.

Therefore, there is a need of providing an improved facial tracking method for calculating and tracking the number of persons in order to overcome the above drawbacks.

SUMMARY OF THE INVENTION

The present invention provides a facial tracking method with a fast computing speed.

In accordance with an aspect of the present invention, there is provided a facial tracking method for detecting and tracking plural face images within a specified region in a set time period. The facial tracking method includes the following steps. Firstly, an image acquiring operation is performed for continuously shooting the specified region at the same viewing angle, thereby acquiring plural photo images. Then, a first facial detecting operation is performed for extracting a current photo image from the plural photo images and detecting whether there is any face image in the entire of the current photo image. If a first face image is included in the current photo image, a first facial data corresponding to the first face image is recorded into a database. Then, a first facial tracking operation is performed for determining whether the first face image exists in a next photo image, which is posterior to the current photo image. The step of performing the first facial tracking operation includes sub-steps of locating plural first tracking frames in the current photo image by taking a first face frame including the first face image as a center, extracting the next photo image, calculating plural similarities between images included in the next photo image corresponding to the plural first tracking frames and the image included in the first face frame, and detecting whether there is any face image in the next photo image corresponding to the first tracking frame with the highest similarity relative to the image included in the first face frame. If a face image is included in the next photo image corresponding to the first tracking frame with the highest similarity, the face image is recognized as the first face image, and the first facial data is updated according to information corresponding to the first tracking frame with the highest similarity. If no face image is included in the next photo image corresponding to the first tracking frame with the highest similarity, the first face image is considered to be excluded from the next photo image, and the first facial data is updated.

In an embodiment, the first facial data includes a position of the first face image in each photo image, a tracking state of the first face image in each photo image, the number of the photo images the first face image exists, a facial texture of the first face image, and a color feature of a specified part under the first face image. The tracking state includes a continuous tracking state, a lost tracking state or a stop tracking state. If the first face image exists in a specified photo image, the first face image is in the continuous tracking state. If the first face image does not exist in the specified photo image, the first face image is in the lost tracking state. If the first face image does not exist in several consecutive photo images, the first face image is in the stop tracking state.

In an embodiment, after the first facial tracking operation is performed, the facial tracking method further includes a step of performing a second facial tracking operation for determining whether the first face image exists in a subsequent photo image, which is posterior to the next photo image. If a face image is included in the next photo image corresponding to the first tracking frame with the highest similarity, the step of performing the second facial tracking operation includes the following steps. Firstly, plural second tracking frames are located in the next photo image by taking each of the plural first tracking frames as a center. The number of the plural second tracking frames relative to each of the plural first tracking frames is determined according to a similarity between the image included in each of the plural first tracking frame and the first face image. Then, a subsequent photo image which is posterior to the next photo image is extracted. Then, plural similarities between images included in the subsequent photo image corresponding to the plural second tracking frames and the image included in the next photo image corresponding to the first tracking frame with the highest similarity are calculated. Then, detect whether there is any face image in the subsequent photo image corresponding to the second tracking frame with the highest similarity relative to the first tracking frame with the highest similarity. If a face image is included in the subsequent photo image corresponding to the second tracking frame with the highest similarity, the face image is recognized as the first face image, and the first facial data is updated according to information corresponding to the second tracking frame with the highest similarity. If no face image is included in the subsequent photo image corresponding to the second tracking frame with the highest similarity, the first face image is considered to be excluded from the subsequent photo image, and the first facial data is updated.

In an embodiment, after the second facial tracking operation is performed, the facial tracking method further includes a step of performing a second facial detecting operation for detecting whether there is any additional face image in the entire of the subsequent photo image.

In an embodiment, during the second facial detecting operation is performed, if a second face image is included in the subsequent photo image and the face image is included in the subsequent photo image corresponding to the second tracking frame with the highest similarity, a comparison process is performed to judge whether the second face image and the first face image belong to the same person. The comparison process includes the following steps. Firstly, a position of a second face frame including the second face image is compared with a position of the second tracking frame with the highest similarity. If the position of the second face frame and the position of the second tracking frame with the highest similarity are highly overlapped, it is confirmed that the second face image and the first face image belong to the same person, and the first facial data is updated according to a second facial data of the second face image. If the position of the second face frame and the position of the second tracking frame with the highest similarity are not highly overlapped, a facial texture similarity between the second face image and the first face image and a color feature similarity between a specified part under the second face image and a specified part under the first face image are calculated. If the facial texture similarity and the color feature similarity between the second face image and the first face image are both smaller than a first threshold value, it is confirmed that the second face image and the first face image do not belong to the same person, and the second facial data of the second face image is recorded into the database. If the facial texture similarity and the color feature similarity between the second face image and the first face image are both higher than the first threshold value, it is confirmed that the second face image and the first face image belong to the same person, and the first facial data is updated according to the second facial data of the second face image.

In an embodiment, the second facial data includes a position of the second face image in each photo image, a tracking state of the second face image in each photo image, the number of the photo images the second face image exists, a facial texture of the second face image, and a color feature of a specified part under the second face image. The tracking state includes a continuous tracking state, a lost tracking state or a stop tracking state. If the second face image exists in a specified photo image, the second face image is in the continuous tracking state. If the second face image does not exist in the specified photo image, the second face image is in the lost tracking state. If the second face image does not exist in several consecutive photo images, the second face image is in the stop tracking state.

In an embodiment, during the second facial detecting operation is performed, if a second face image is included in the subsequent photo image and no face image is included in the subsequent photo image corresponding to the second tracking frame with the highest similarity, a comparison process is performed to judge whether the second face image and the first face image belong to the same person. The comparison process includes the following steps. Firstly, a facial texture similarity between the second face image and the first face image and a color feature similarity between a specified part under the second face image and a specified part under the first face image are calculated. If the facial texture similarity and the color feature similarity between the second face image and the first face image are both smaller than a first threshold value, it is confirmed that the second face image and the first face image do not belong to the same person, and a second facial data of the second face image is recorded into the database. If the facial texture similarity and the color feature similarity between the second face image and the first face image are both higher than the first threshold value, it is confirmed that the second face image and the first face image belong to the same person, and the first facial data is updated according to the second facial data of the second face image.

In an embodiment, the second facial data includes a position of the second face image in each photo image, a tracking state of the second face image in each photo image, the number of the photo images the second face image exists, a facial texture of the second face image, and a color feature of a specified part under the second face image. The tracking state includes a continuous tracking state, a lost tracking state or a stop tracking state. If the second face image exists in a specified photo image, the second face image is in the continuous tracking state. If the second face image does not exist in the specified photo image, the second face image is in the lost tracking state. If the second face image does not exist in several consecutive photo images, the second face image is in the stop tracking state.

In an embodiment, after the first facial tracking operation is performed, the facial tracking method further includes a step of performing a second facial tracking operation for determining whether the first face image exists in a subsequent photo image, which is posterior to the next photo image. If no face image is included in the next photo image corresponding to the first tracking frame with the highest similarity, the step of performing the second facial tracking operation includes the following steps. Firstly, the subsequent photo image is extracted. Then, a second tracking frame with a local area is located in the subsequent photo image. And a center of the local area is corresponding to the first face frame of the current photo image. Then, detect whether there is any face image in the second tracking frame of the subsequent photo image. If no face image is included in the second tracking frame, it is confirmed that the first face image is not included in the subsequent photo image, and then judge whether the number of times the first face image is in the lost tracking state is larger than a second threshold value. If the number of times the first face image is in the lost tracking state is larger than a second threshold value, the first face image is no longer searched from remaining photo images. If a face image is included in the second tracking frame, a facial texture similarity between the first face image and the face image included in the second tracking frame is calculated. If the facial texture similarity between the first face image and the face image included in the second tracking frame is larger than a third threshold value, it is confirmed that the first face image and the face image included in the second tracking frame belong to the same person, and the first facial data is updated according to information corresponding to the second tracking frame. If the facial texture similarity between the first face image and the face image included in the second tracking frame is smaller than the third threshold value, it is confirmed that the first face image is not included in the subsequent photo image, and then judge whether the number of times the first face image is in the lost tracking state is larger than the second threshold value. If the number of times the first face image is in the lost tracking state is larger than the second threshold value, the first face image is no longer searched from the remaining photo images. If the facial texture similarity between the first face image and the face image included in the second tracking frame is smaller than the third threshold value, it is confirmed that the face image included in the second tracking frame is a third face image different from the first face image, and a third facial data of the third face image is recorded into the database.

In an embodiment, the third facial data includes a position of the third face image in each photo image, a tracking state of the third face image in each photo image, the number of the photo images the second face image exists, a facial texture of the third face image, and a color feature of a specified part under the third face image. The tracking state includes a continuous tracking state, a lost tracking state or a stop tracking state. If the third face image exists in a specified photo image, the third face image is in the continuous tracking state. If the third face image does not exist in the specified photo image, the third face image is in the lost tracking state. If the third face image does not exist in several consecutive photo images, the third face image is in the stop tracking state.

In an embodiment, after the second facial tracking operation is performed, the facial tracking method further includes a step of performing a second facial detecting operation for detecting whether there is any additional face image in the entire of the subsequent photo image.

In an embodiment, during the second facial detecting operation is performed, if a second face image in the subsequent photo image is detected and the face image included in the second tracking frame and the first face image belong to the same person, a comparison process is performed to judge whether the second face image and the first face image belong to the same person. The comparison process includes the following steps. Firstly, a position of a second face frame including the second face image is compared with a position of the second tracking frame. If the position of the second face frame and the position of the second tracking frame are highly overlapped, it is confirmed that the second face image and the first face image belong to the same person, and the first facial data is updated according to a second facial data of the second face image. If the position of the second face frame and the position of the second tracking frame are not highly overlapped, a facial texture similarity between the second face image and the face image included in the second tracking frame and a color feature similarity between a specified part under the second face image and a specified part under the face image included in the second tracking frame are calculated. If the facial texture similarity and the color feature similarity between the second face image and the face image included in the second tracking frame are both smaller than a first threshold value, it is confirmed that the second face image and the first face image do not belong to the same person, and the second facial data of the second face image is recorded into the database. If the facial texture similarity and the color feature similarity between the second face image and the face image included in the second tracking frame are both higher than the first threshold value, it is confirmed that the second face image and the first face image belong to the same person, and the first facial data is updated according to the second facial data of the second face image.

In an embodiment, the second facial data includes a position of the second face image in each photo image, a tracking state of the second face image in each photo image, the number of the photo images the second face image exists, a facial texture of the second face image, and a color feature of a specified part under the second face image. The tracking state includes a continuous tracking state, a lost tracking state or a stop tracking state. If the second face image exists in a specified photo image, the second face image is in the continuous tracking state. If the second face image does not exist in the specified photo image, the second face image is in the lost tracking state. If the second face image does not exist in several consecutive photo images, the second face image is in the stop tracking state.

In an embodiment, during the second facial detecting operation is performed, if a second face image in the subsequent photo image is detected and the face image included in the second tracking frame is the third face image, a comparison process is performed to judge whether the second face image and the third face image or the first face image belong to the same person. The comparison process includes following steps. Firstly, a position of a second face frame including the second face image is compared with a position of the second tracking frame. If the position of the second face frame and the position of the second tracking frame are highly overlapped, it is confirmed that the second face image and the third face image belong to the same person, and the third facial data is updated according to a second facial data of the second face image. If the position of the second face frame and the position of the second tracking frame are not highly overlapped, a facial texture similarity between the second face image and the third face image and a color feature similarity between a specified part under the second face image and a specified part under the third face image are calculated, and a facial texture similarity between the second face image and the first face image and a color feature similarity between a specified part under the second face image and a specified part under the first face image are calculated. If the facial texture similarity and the color feature similarity between the second face image and the third face image and the facial texture similarity and the color feature similarity between the second face image and the first face image are all smaller than a first threshold value, it is confirmed that the second face image and the third face image and the first face image do not belong to the same person, and the second facial data of the second face image is recorded into the database. If the facial texture similarity and the color feature similarity between the second face image and the third face image or the facial texture similarity and the color feature similarity between the second face image and the first face image are larger than the first threshold value, it is confirmed that the second face image and the third face image or the first face image belong to the same person, and the first facial data or the third facial data is updated according to the second facial data of the second face image.

In an embodiment, the second facial data includes a position of the second face image in each photo image, a tracking state of the second face image in each photo image, the number of the photo images the second face image exists, a facial texture of the second face image, and a color feature of a specified part under the second face image. The tracking state includes a continuous tracking state, a lost tracking state or a stop tracking state. If the second face image exists in a specified photo image, the second face image is in the continuous tracking state. If the second face image does not exist in the specified photo image, the second face image is in the lost tracking state. If the second face image does not exist in several consecutive photo images, the second face image is in the stop tracking state.

In an embodiment, during the second facial detecting operation is performed, if a second face image in the subsequent photo image is detected and no face image is included in the second tracking frame, a comparison process is performed to judge whether the second face image and the first face image belong to the same person. The comparison process includes the following steps. Firstly, a facial texture similarity between the second face image and the first face image and a color feature similarity between a specified part under the second face image and a specified part under the first face image are calculated. If the facial texture similarity and the color feature similarity between the second face image and the first face image are both smaller than a first threshold value, it is confirmed that the second face image and the first face image do not belong to the same person, and a second facial data of the second face image is recorded into the database. If the facial texture similarity and the color feature similarity between the second face image and the first face image are both higher than the first threshold value, it is confirmed that the second face image and the first face image belong to the same person, and the first facial data is updated according to the second facial data of the second face image.

In an embodiment, the second facial data includes a position of the second face image in each photo image, a tracking state of the second face image in each photo image, the number of the photo images the second face image exists, a facial texture of the second face image, and a color feature of a specified part under the second face image. The tracking state includes a continuous tracking state, a lost tracking state or a stop tracking state. If the second face image exists in a specified photo image, the second face image is in the continuous tracking state. If the second face image does not exist in the specified photo image, the second face image is in the lost tracking state. If the second face image does not exist in several consecutive photo images, the second face image is in the stop tracking state.

In an embodiment, the facial tracking method further includes a step of performing a facial verification process. The facial verification process includes the following steps. If a first condition is satisfied, all facial data of the database are moved to a temporary storing zone. If a second condition is satisfied, a specified facial data of the temporary storing zone is moved to a combination result storing zone. Then, a similarity between an additional facial data of the temporary storing zone and the specified facial data is calculated. If the similarity is larger than a fourth threshold value, the additional facial data is merged into the specified facial data. If the similarity is smaller than the fourth threshold value, the additional facial data is added to the combination result storing zone. The steps of acquiring any facial data from the temporary storing zone and comparing the acquired facial data with all facial data of the combination result storing zone are repeatedly done until all facial data of the temporary storing zone are merged into or added to the combination result storing zone.

In an embodiment, the first condition indicates that the number of all facial data in the database reaches a fifth threshold value.

In an embodiment, the first condition indicates that a flowchart of detecting and tracking the plural face images is ended and the number of facial data in the database is not zero.

In an embodiment, the second condition indicates that the number of all facial data in the temporary storing zone reaches a fifth threshold value.

In an embodiment, the second condition indicates that a flowchart of detecting and tracking the plural face images is ended and all facial data in the database are moved to the temporary storing zone.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
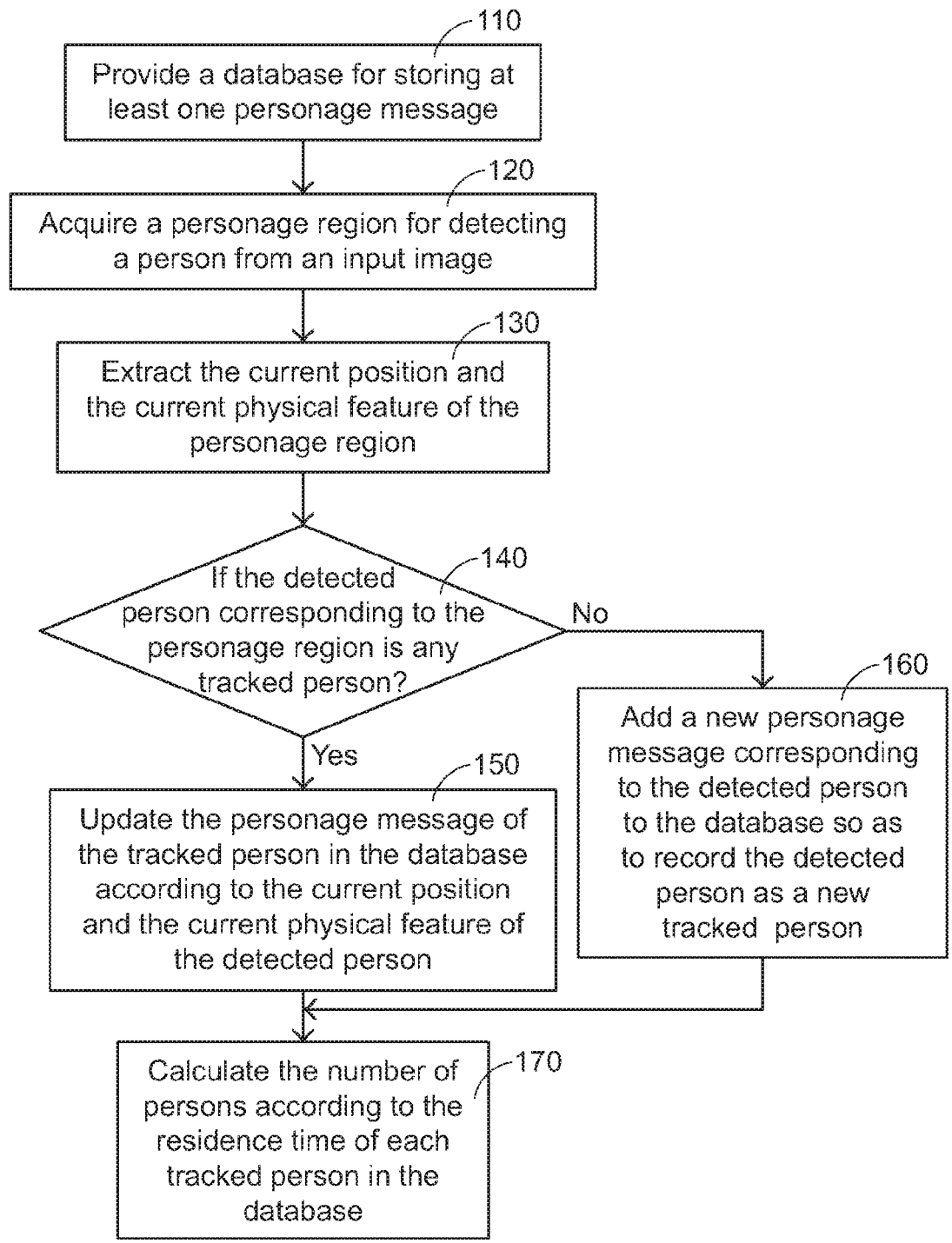
FIG. 1 is a flowchart illustrating a conventional method of counting and tracking the number of persons.
Figure 2:
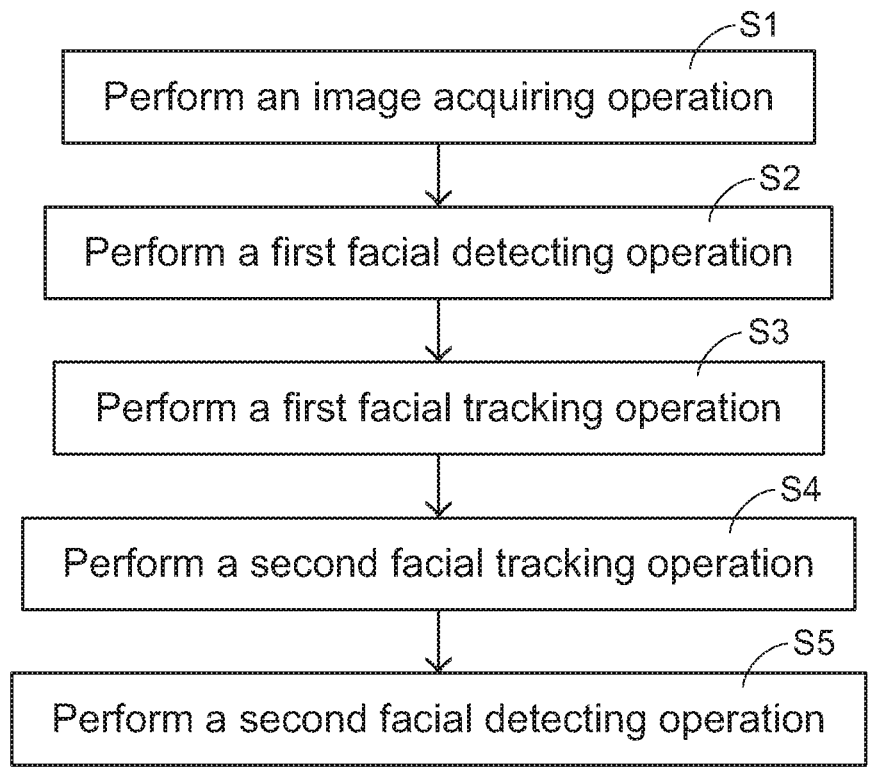
FIG. 2 schematically illustrates a flowchart of a facial tracking method according to an embodiment of the present invention.

The present invention provides a facial tracking method. FIG. 2 schematically illustrates a flowchart of a facial tracking method according to an embodiment of the present invention. The facial tracking method comprises the following steps. In the step S1, an image acquiring operation is performed. In the step S2, a first facial detecting operation is performed. In the step S3, a first facial tracking operation is performed. In the step S4, a second facial tracking operation is performed. In the step S5, a second facial detecting operation is performed.

It is noted that the sequence of these steps of the facial tracking method according to the present invention are not stringently restricted if the efficacy of the present invention can be achieved. Moreover, these steps are not necessarily consecutive, and some additional steps may be interposed between these steps.

The steps of the facial tracking method will be illustrated in more details as follows.

Figure 3:
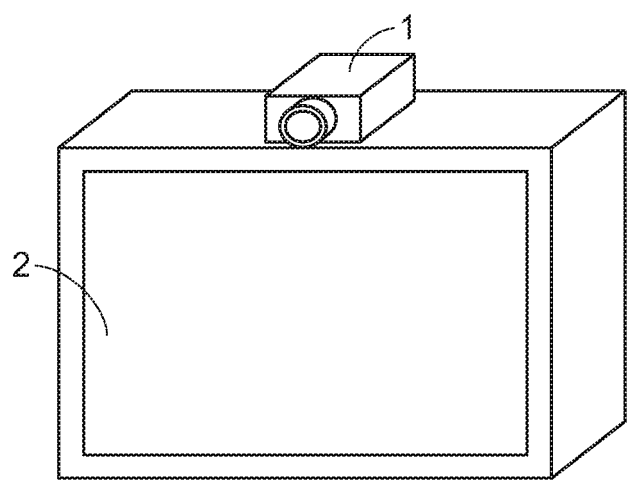
FIG. 3 is a schematic view illustrating an image capture device and an electronic billboard for performing the facial tracking method according to an embodiment of the present invention.

FIG. 3 is a schematic view illustrating an image capture device and an electronic billboard for performing the facial tracking method according to an embodiment of the present invention.

In the step S1, the image capture device 1 (e.g. a camera) is used to continuously shoot the same region at the same viewing angle in a set time period, thereby acquiring plural photo images. In an embodiment, the image capture device 1 is installed on the electronic billboard 2. Consequently, plural photo images are acquired at the same viewing angle in the set time period. After the plural images are acquired, all face images in front of the electronic billboard 2 in the set time period will be detected and tracked.

Figure 4:
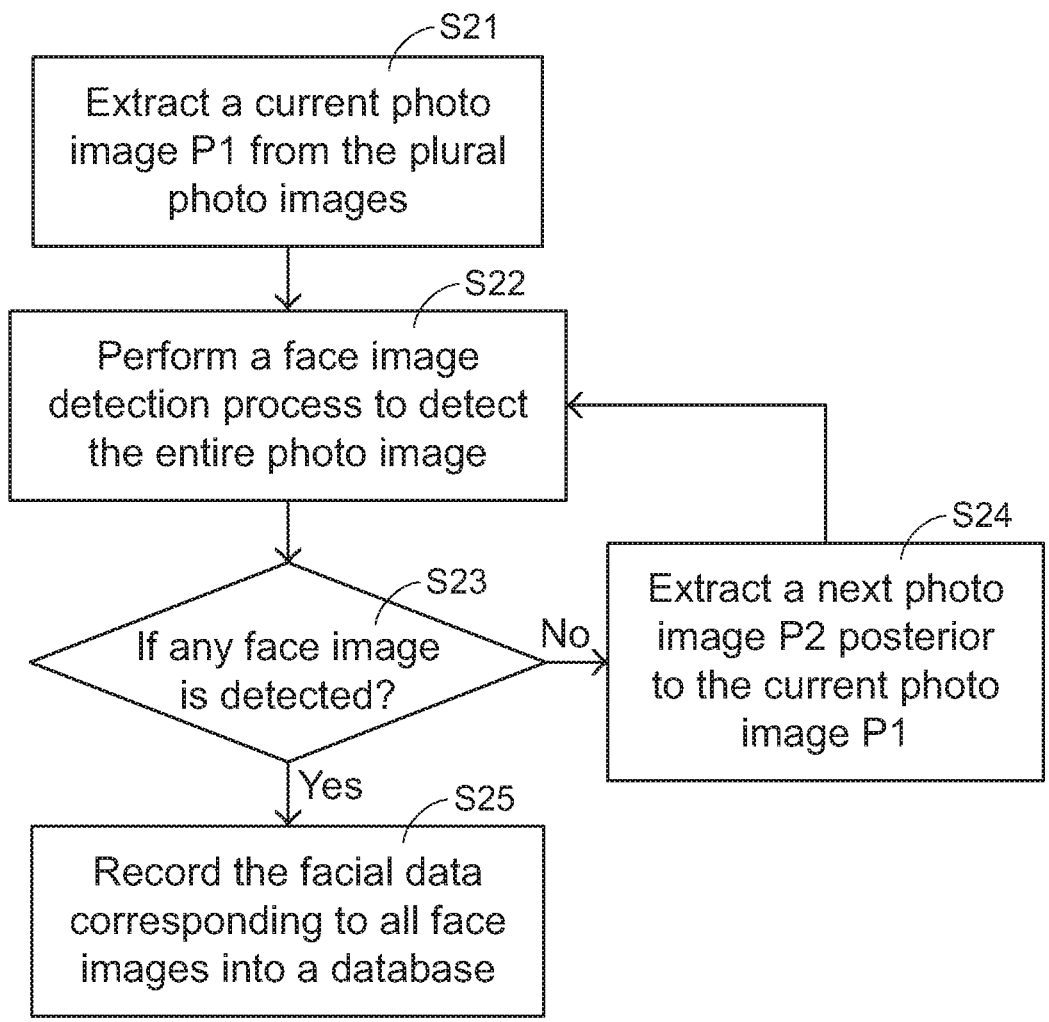
FIG. 4 is a flowchart illustrating the step S2 of performing a first facial detecting operation in the facial tracking method according to an embodiment of the present invention.
Figure 5:
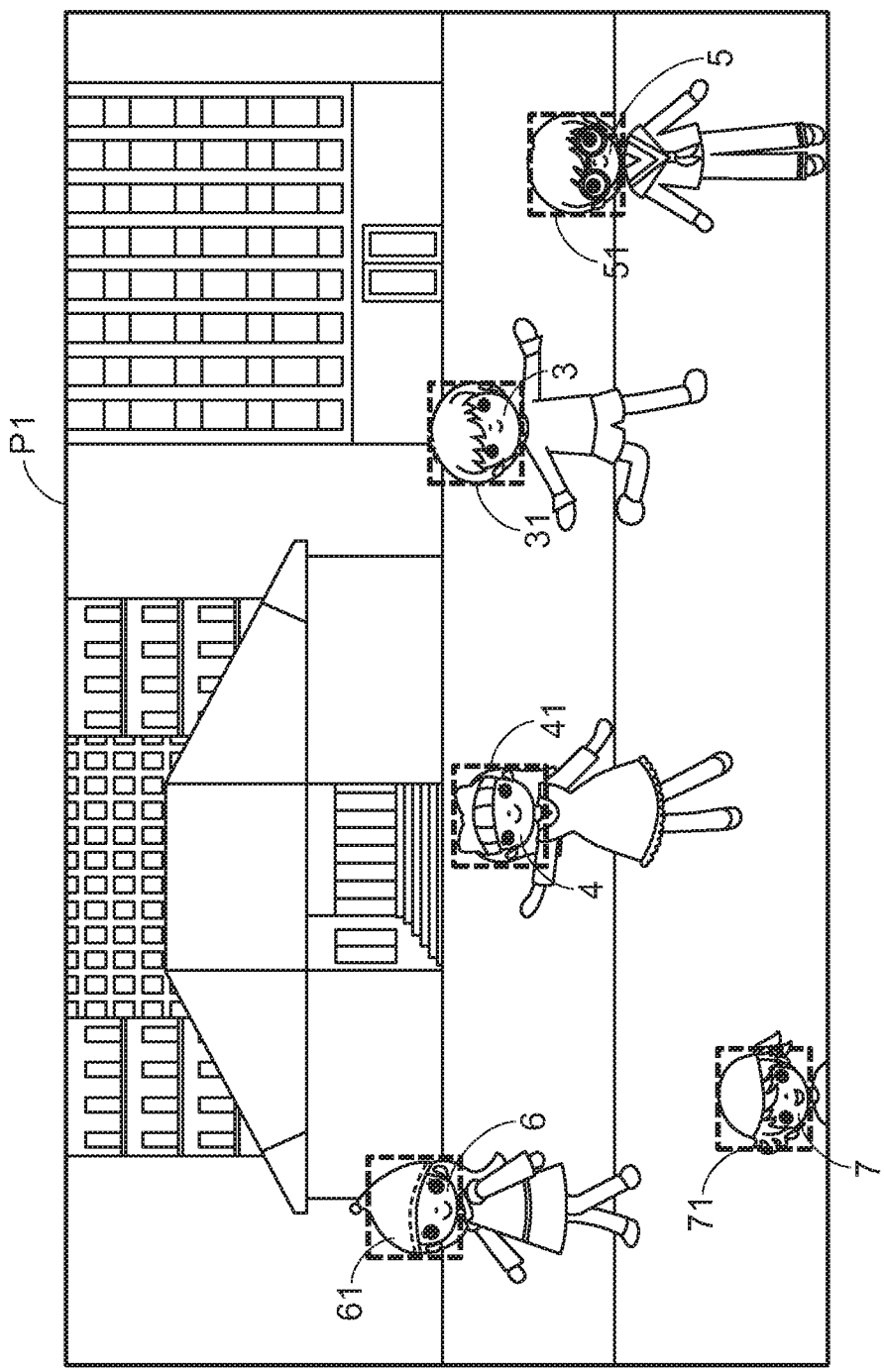
FIG. 5 is a schematic view illustrating plural face images of a current photo image P1 detected by the step S2 of the facial tracking method of the present invention.

Hereinafter, the step S2 will be illustrated with reference to FIGS. 2, 4 and 5. FIG. 4 is a flowchart illustrating the step S2 of performing a first facial detecting operation in the facial tracking method according to an embodiment of the present invention. FIG. 5 is a schematic view illustrating plural face images of a current photo image P1 detected by the step S2 of the facial tracking method of the present invention.

As shown in the step S21 of FIG. 4, the current photo image P1 is extracted from the plural photo images. For example, the current photo image P1 may be the first photo image of the plural photo images. Then, in the step S22, a face image detection process is performed to detect the entire current photo image P1. In this embodiment, any applicable algorithm (e.g. an Adaboost algorithm) may be utilized in the present invention to obtain potential candidate regions for detecting face images. After the adjacent candidate regions are deleted or merged, the remaining candidate regions are the regions containing face images. Then, the step S23 is performed to judge whether there is any face image in the entire current photo image P1. If no face image is included in the current photo image P1, the step S24 is performed to extract a next photo image P2, and then the step S22 is repeatedly done. It is noted that the current photo image P1 as shown in FIG. 5 is presented herein for purpose of illustration and description only. The number of face images and the states of the face images in the current photo image P1 are not restricted to those shown in the drawings.

Please refer to FIG. 5 again. In this embodiment, a first face image 3, a second face image 4, a third face image 5, a fourth face image 6 and a fifth face image 7 are included in the current photo image P1. Next, in the step S25, the facial data corresponding to the first face image 3, the second face image 4, the third face image 5, the fourth face image 6 and the fifth face image 7 are recorded into a database.

The facial data include but are not limited to the position of each face image in each photo image, the tracking state of each face image in each photo image, the number of photo images each face image exists, a facial texture of each face image and a color feature of a specified part under each face image. The tracking state includes a continuous tracking state, a lost tracking state or a stop tracking state. If a face image exists in a photo image, the face image is in the continuous tracking state. If a face image does not exist in a photo image, the face image is in the lost tracking state. If a face image does not exist in several consecutive photo images (i.e. the face image is not detected in several consecutive photo images), the face image is in the stop tracking state. Since the first face image 3, the second face image 4, the third face image 5, the fourth face image 6 and the fifth face image 7 exist in the current photo image P1, the tracking state of the first face image 3, the second face image 4, the third face image 5, the fourth face image 6 and the fifth face image 7 of the current photo image P1 are continuous tracking state. Moreover, the positions of the first face image 3, the second face image 4, the third face image 5, the fourth face image 6 and the fifth face image 7 of the current photo image P1 are denoted by a first face frame 31, a second face frame 41, a third face frame 51, a forth face frame 61 and a fifth face frame 71, respectively.

Figure 6:
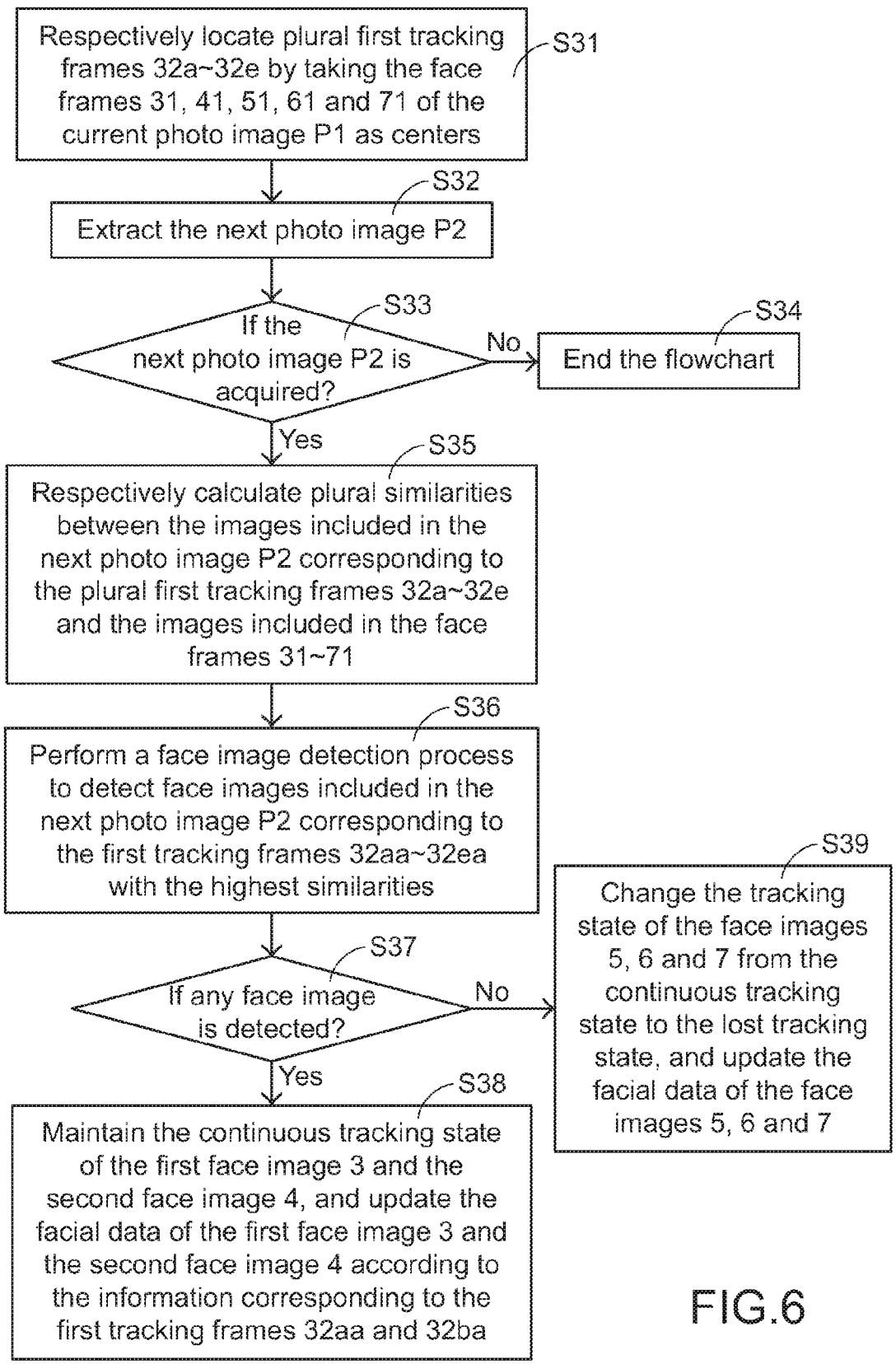
FIG. 6 is a flowchart illustrating the step S3 of performing a first facial tracking operation in the facial tracking method according to an embodiment of the present invention.
Figure 7:
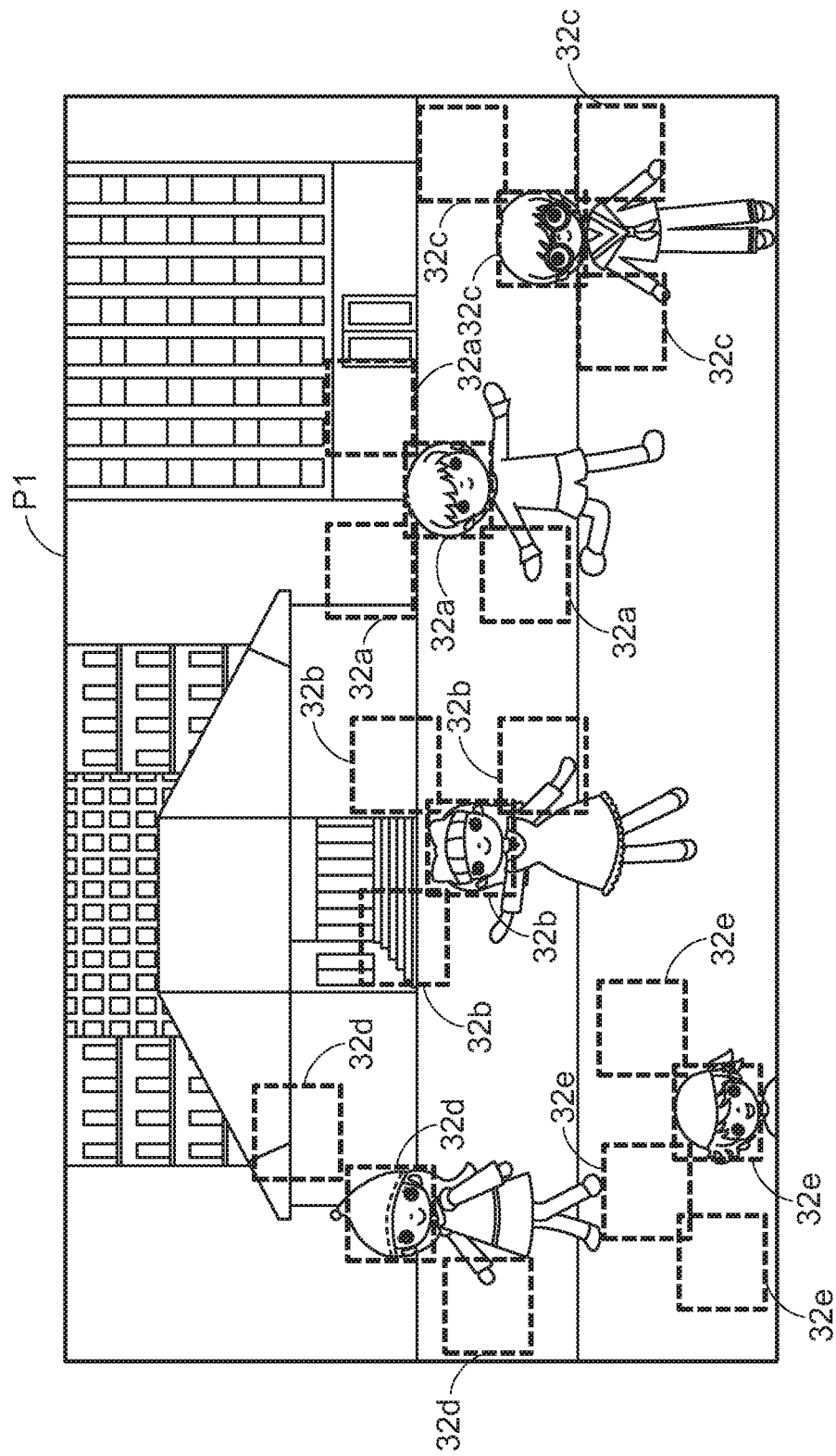
FIG. 7 is a schematic view illustrating plural first tacking frames shown on the current photo image P1 according to an embodiment of the present invention.
Figure 8A:
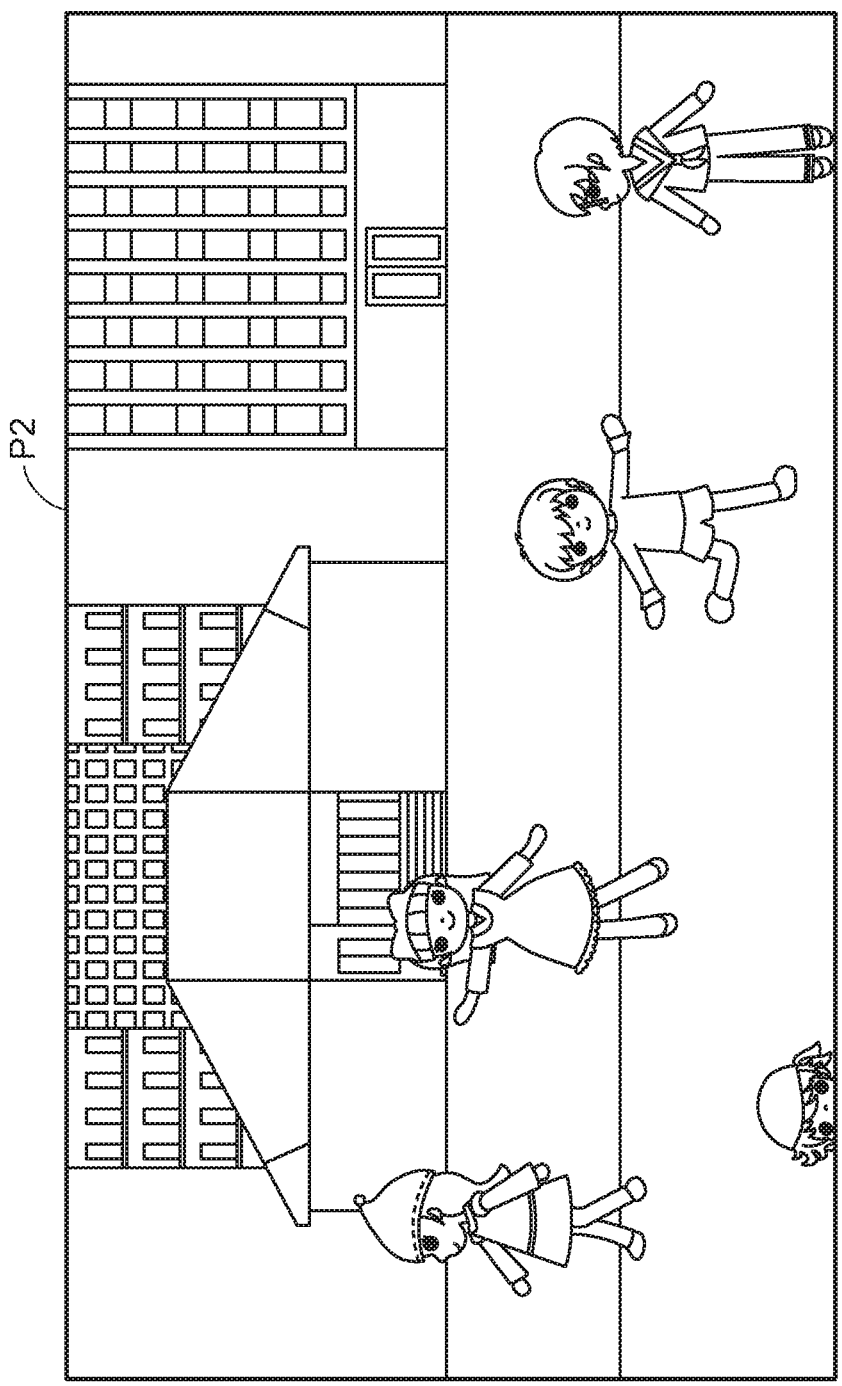
FIG. 8A is a schematic view illustrating the next photo image P2 according to an embodiment of the present invention.
Figure 8B:
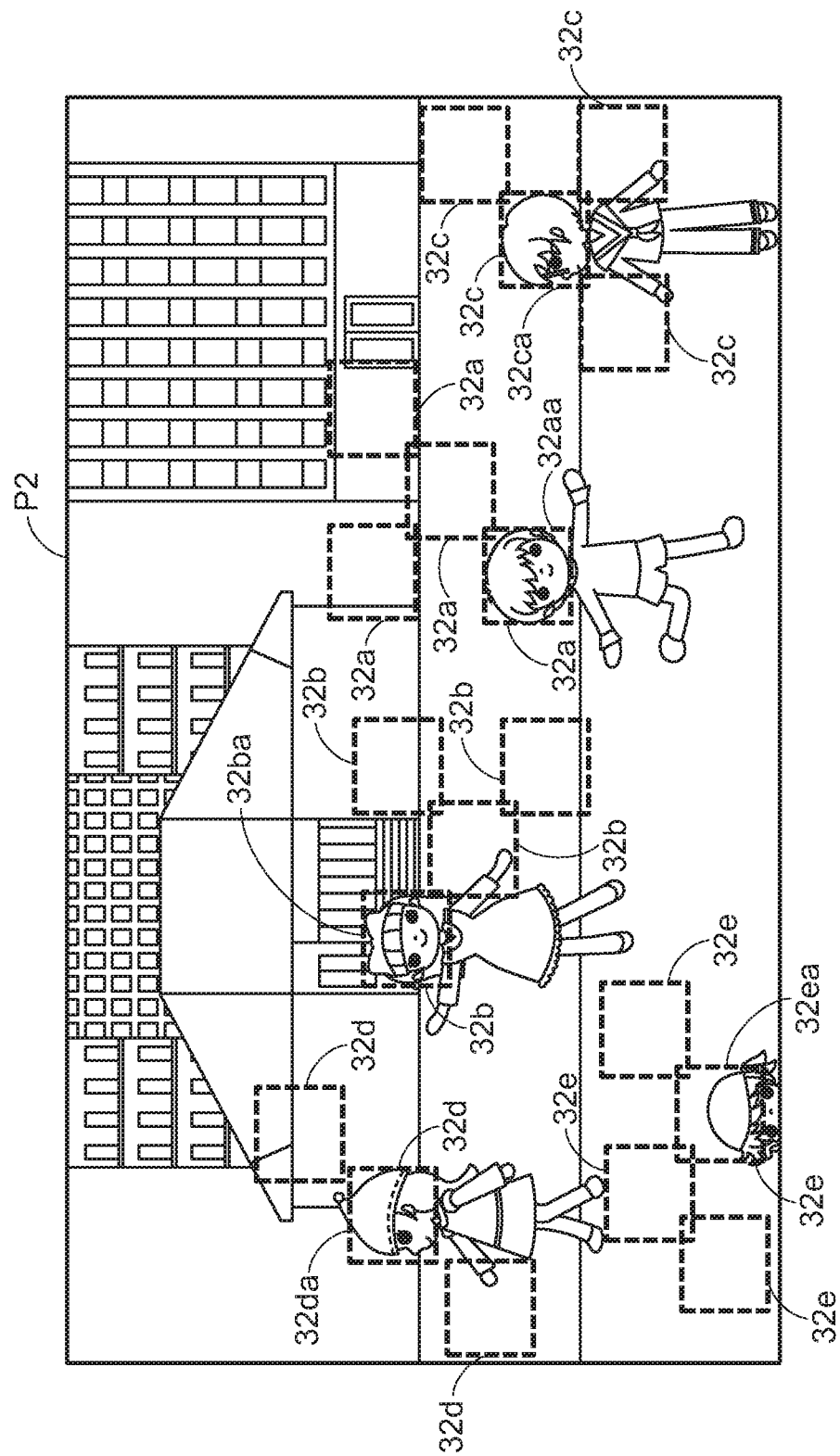
FIG. 8B is a schematic view illustrating the corresponding positions of the plural first tacking frames 32a-32e on the next photo image P2 according to an embodiment of the present invention.
Figure 9A:
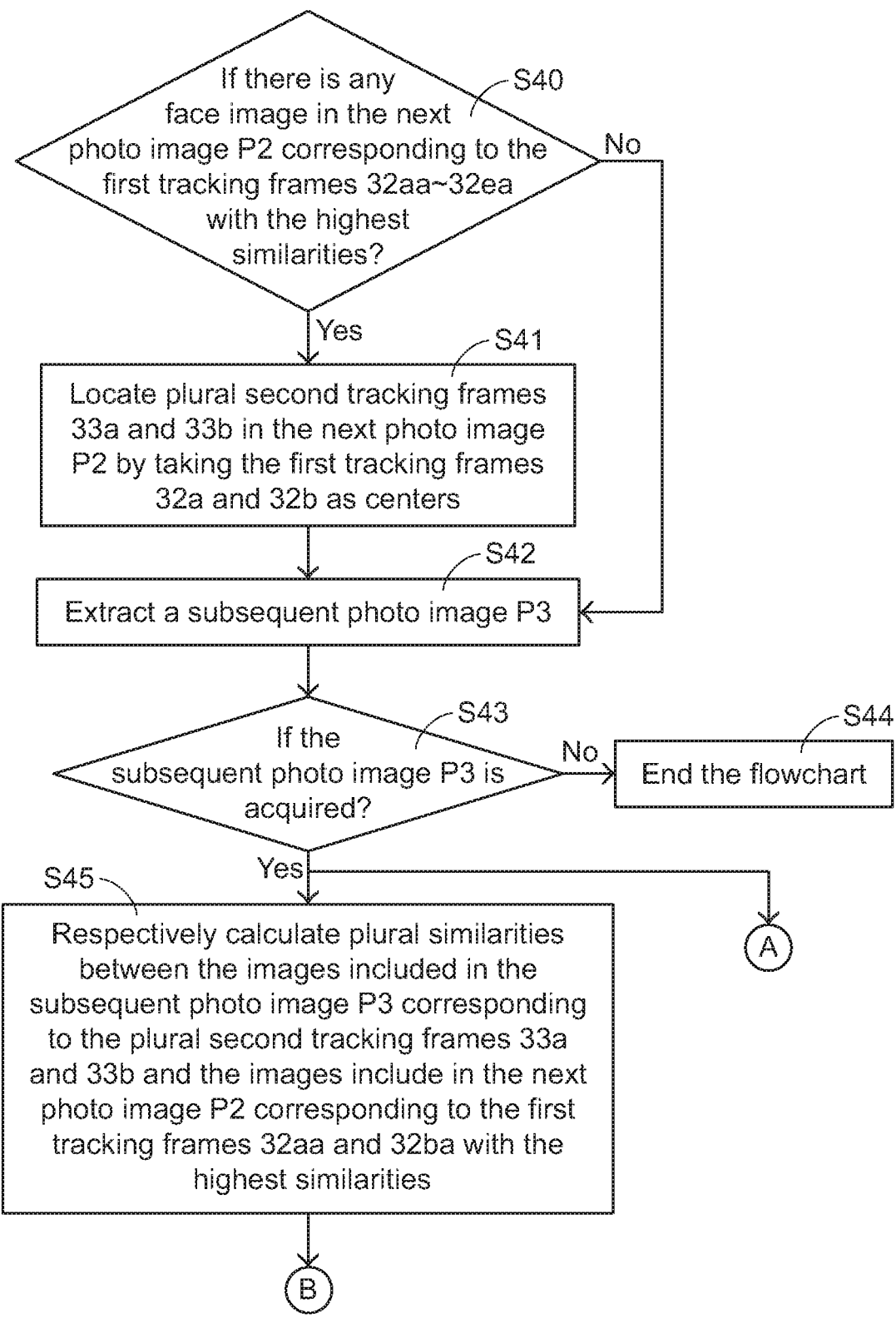
FIGS. 9A to 9D are a flowchart illustrating the step S4 of performing a second facial tracking operation in the facial tracking method according to an embodiment of the present invention.
Figure 9B:
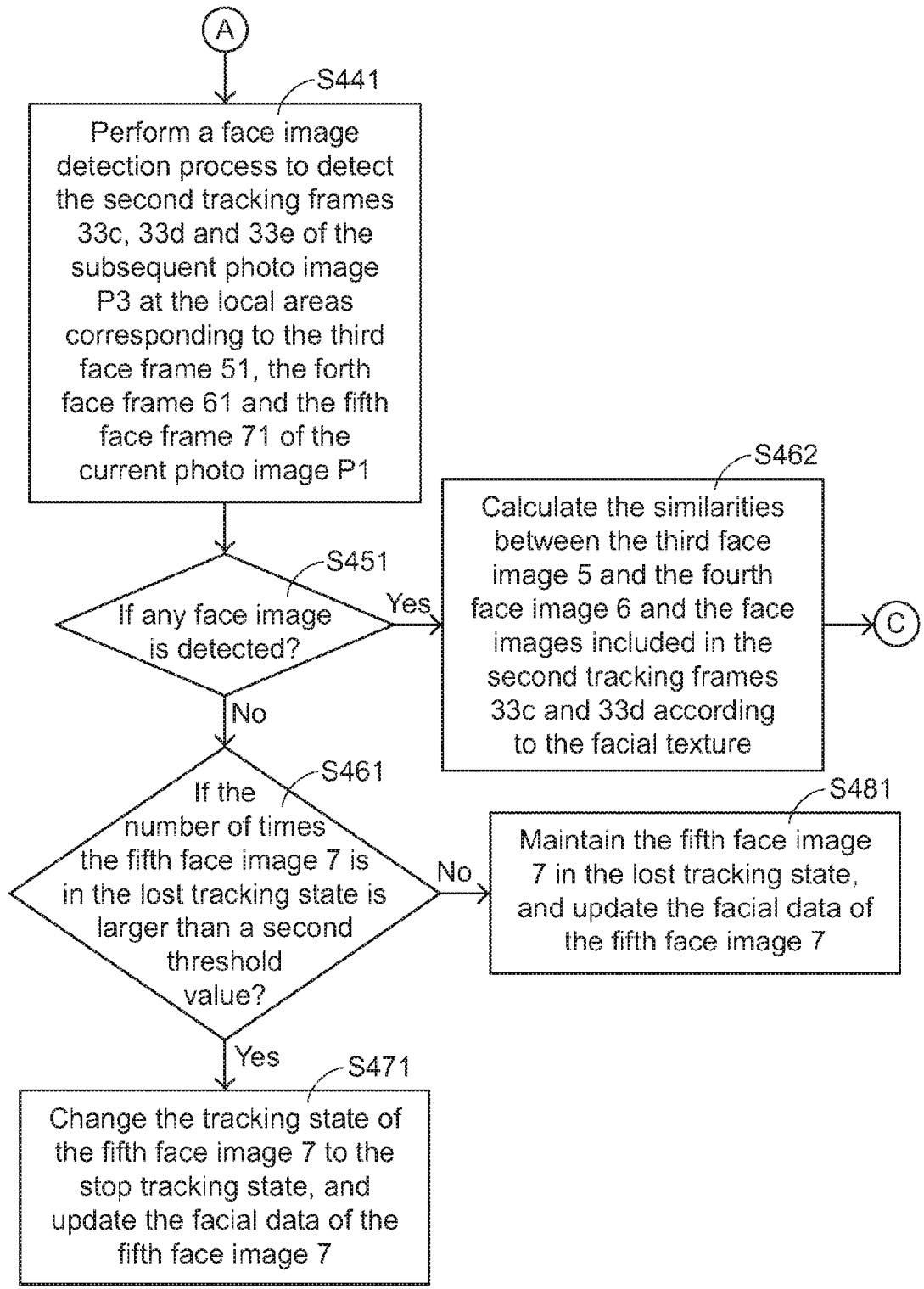
Figure 9C:
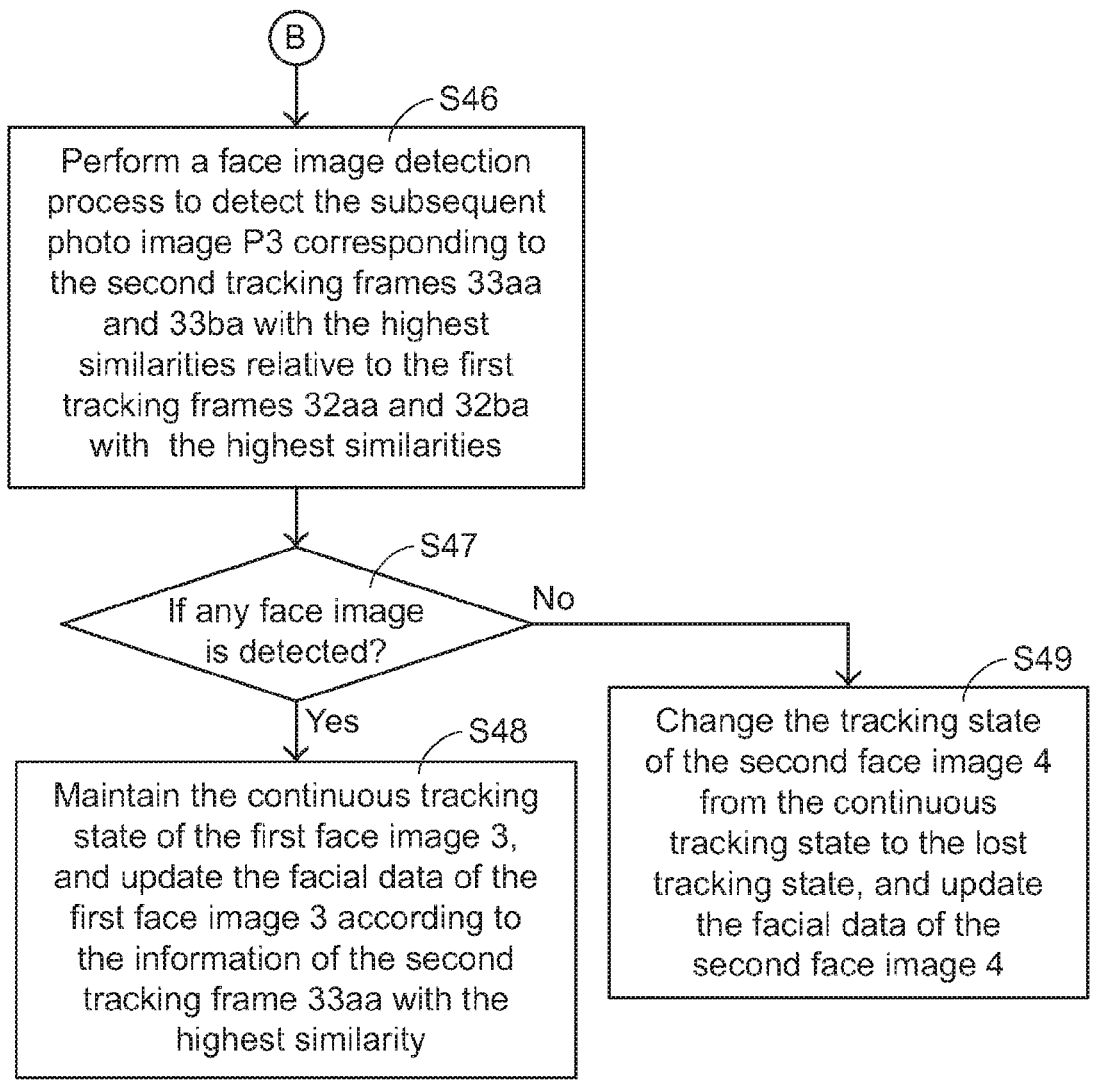
Figure 9D:
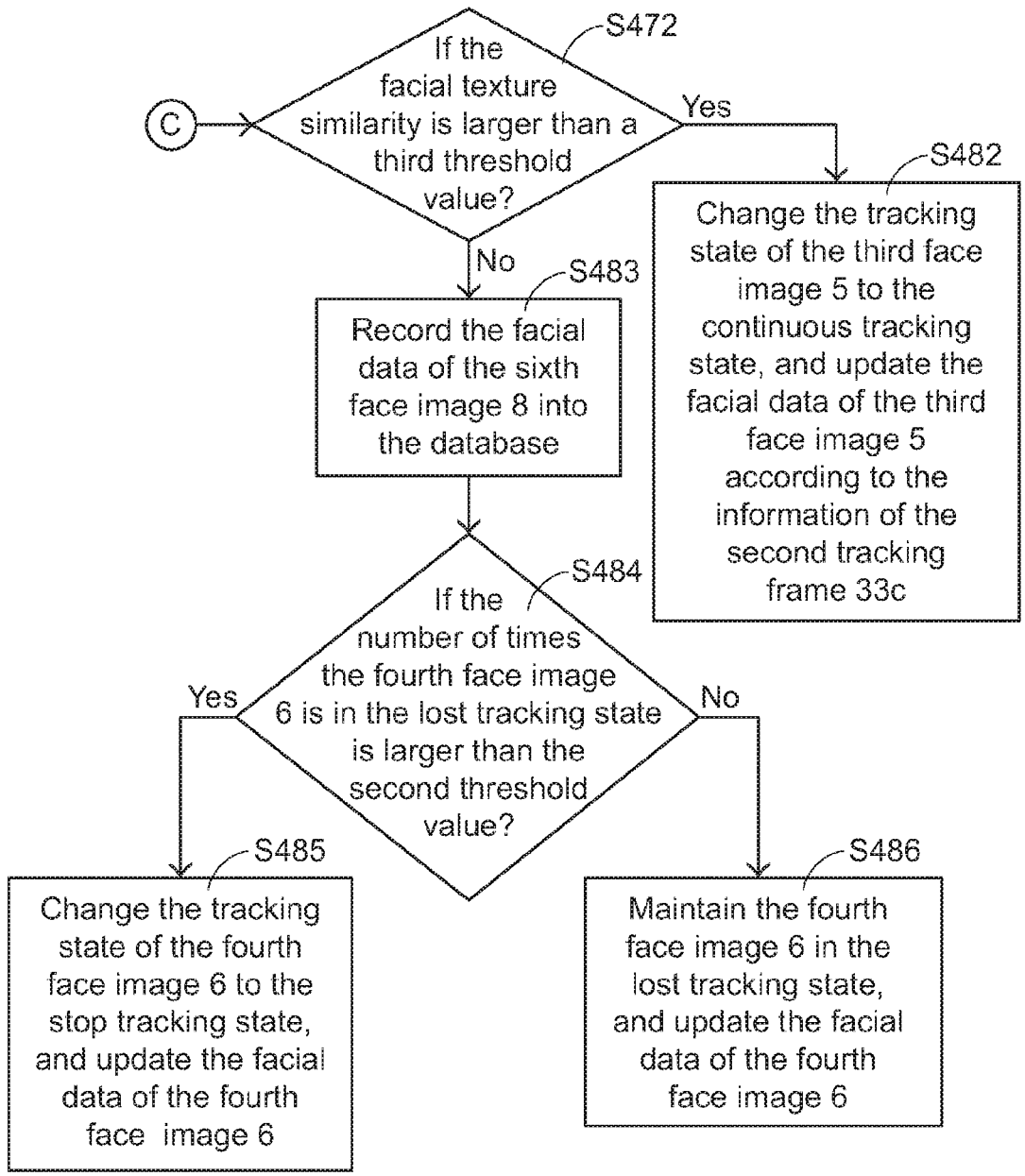

Hereinafter, the step S3 will be illustrated with reference to FIGS. 6, 7, 8A and 8B. FIG. 6 is a flowchart illustrating the step S3 of performing a first facial tracking operation in the facial tracking method according to an embodiment of the present invention. FIG. 7 is a schematic view illustrating plural first tacking frames 32a-32e shown on the current photo image P1 according to an embodiment of the present invention. FIG. 8A is a schematic view illustrating the next photo image P2 according to an embodiment of the present invention. FIG. 8B is a schematic view illustrating the corresponding positions of the plural first tacking frames 32a-32e on the next photo image P2 according to an embodiment of the present invention. The step S3 is performed to judge whether the first face image 3, the second face image 4, the third face image 5, the fourth face image 6 and the fifth face image 7 exist in the next photo image P2, which is posterior to the current photo image P1.

Firstly, in the step S31, plural first tracking frames 32a, 32b, 32c, 32d and 32e are located in the current photo image P1 at the positions around or overlapped with the first face frame 31, the second face frame 41, the third face frame 51, the forth face frame 61 and the fifth face frame 71 of the current photo image P1, respectively (see FIG. 7). And the plural first tracking frames 32a, 32b, 32c, 32d and 32e are disposed by taking the first face frame 31, the second face frame 41, the third face frame 51, the forth face frame 61 and the fifth face frame 71 as centers, respectively. The arrangements of the plural first tracking frames 32a, 32b, 32c, 32d and 32e may be determined according to Gaussian distribution configuration. Alternatively, the plural first tracking frames 32a, 32b, 32c, 32d and 32e may be evenly distributed in the entire current photo image P1. It is noted that the plural first tracking frames 32a, 32b, 32c, 32d and 32e as shown in FIG. 7 are presented herein for purpose of illustration and description only. The arrangements of the plural first tracking frames 32a, 32b, 32c, 32d and 32e are not restricted to those shown in the drawings.

Then, the step S32 is performed to extract the next photo image P2. Then, the step S33 is performed to judge whether the next photo image P2 is successfully acquired. If the next photo image P2 fails to be acquired, the flowchart is ended (Step S34). In this embodiment, the contents of the next photo image P2 are shown in FIG. 8A. It is noted that the next photo image P2 as shown in FIG. 8A is presented herein for purpose of illustration and description only. The number of face images and the states of the face images in the next photo image P2 are not restricted to those shown in the drawings.

After the next photo image P2 is acquired, the step S35 is performed. Please refer to FIG. 8B. That is, the plural similarities between the images included in the next photo image P2 corresponding to the plural first tracking frames 32a and the image included in the first face frame 31 are calculated. Moreover, the plural similarities between the images included in the next photo image P2 corresponding to the plural first tracking frames 32b and the image included in the second face frame 41 are calculated. Moreover, the plural similarities between the images included in the next photo image P2 corresponding to the plural first tracking frames 32c and the image included in the third face frame 51 are calculated. Moreover, the plural similarities between the images included in the next photo image P2 corresponding to the plural first tracking frames 32d and the image included in the fourth face frame 61 are calculated. Moreover, the plural similarities between the images included in the next photo image P2 corresponding to the plural first tracking frames 32e and the image included in the fifth face frame 71 are calculated.

In this embodiment, the similarities between the images included in the next photo image P2 corresponding to the plural first tracking frames 32a, 32b, 32c, 32d and 32e (see FIG. 8B) and the images included in the face frames 31, 41, 51, 61 and 71 (see FIG. 5) are calculated according to the facial textures and the color features of the specified parts under the images included in the face frames 31, 41, 51, 61 and 71. Moreover, in this embodiment, the respective similarities between the face images included in the next photo image P2 corresponding to the plural first tracking frames 32aa, 32ba, 32ca, 32da and 32ea (see FIG. 8B) and the face images included in the face frames 31, 41, 51, 61 and 71 are the highest. The highest similarities indicate that the first face image 3, the second face image 4, the third face image 5, the fourth face image 6 and the fifth face image 7 have the highest probabilities of existing in the next photo image P2 at the positions corresponding to the first tracking frames 32aa, 32ba, 32ca, 32da and 32ea.

Then, in the step S36, a face image detection process is performed to detect the images included in the next photo image P2 corresponding to the first tracking frames 32aa, 32ba, 32ca, 32da and 32ea with the highest similarities. In this embodiment, any algorithm (e.g. an Adaboost algorithm) may be utilized in the present invention to detect whether there is any face image in the next photo image P2 corresponding to the first tracking frames 32aa, 32ba, 32ca, 32da and 32ea with the highest similarities.

Then, the step S37 is performed to judge whether there is any face image in the next photo image P2 corresponding to the first tracking frames 32aa, 32ba, 32ca, 32da and 32ea with the highest similarities. As shown in FIG. 8B, there are face images in the next photo image P2 corresponding to the first tracking frames 32aa and 32ba with the highest similarities. Under this circumstance, the face image included in the next photo image P2 corresponding to the first tracking frame 32aa with the highest similarity is recognized as the first face image 3, and the face image included in the next photo image P2 corresponding to first tracking frame 32ba with the highest similarity is recognized as the second face image 4. Then, in the step S38, the first face image 3 and the second face image 4 are maintained in the continuous tracking state, and the facial data of the first face image 3 and the second face image 4 in the database are updated. Moreover, in the step S38, the facial data of the first face image 3 in the database is updated according to the position of the first tracking frame 32aa, the facial texture of the face image included in the first tracking frame 32aa and the color feature of the specified part under the face image included in the first tracking frame 32aa. Similarly, the facial data of the second face image 4 in the database is updated according to the position of the first tracking frame 32ba, the facial texture of the face image included in the first tracking frame 32ba and the color feature of the specified part under the face image included in the first tracking frame 32ba.

As shown in FIG. 8B, no face images are included in the next photo image P2 at the positions corresponding to the first tracking frames 32ca, 32da and 32ea with the highest similarities. In other words, the third face image 5, the fourth face image 6 and the fifth face image 7 may be not shown on the next photo image P2 temporarily because the postures are changed or these face images are hidden. Then, in the step S39, the tracking states of the third face image 5, the fourth face image 6 and the fifth face image 7 are changed from the continuous tracking states to the lost tracking states. In addition, the facial data of the third face image 5, the fourth face image 6 and the fifth face image 7 in the database are updated.

Figure 10:
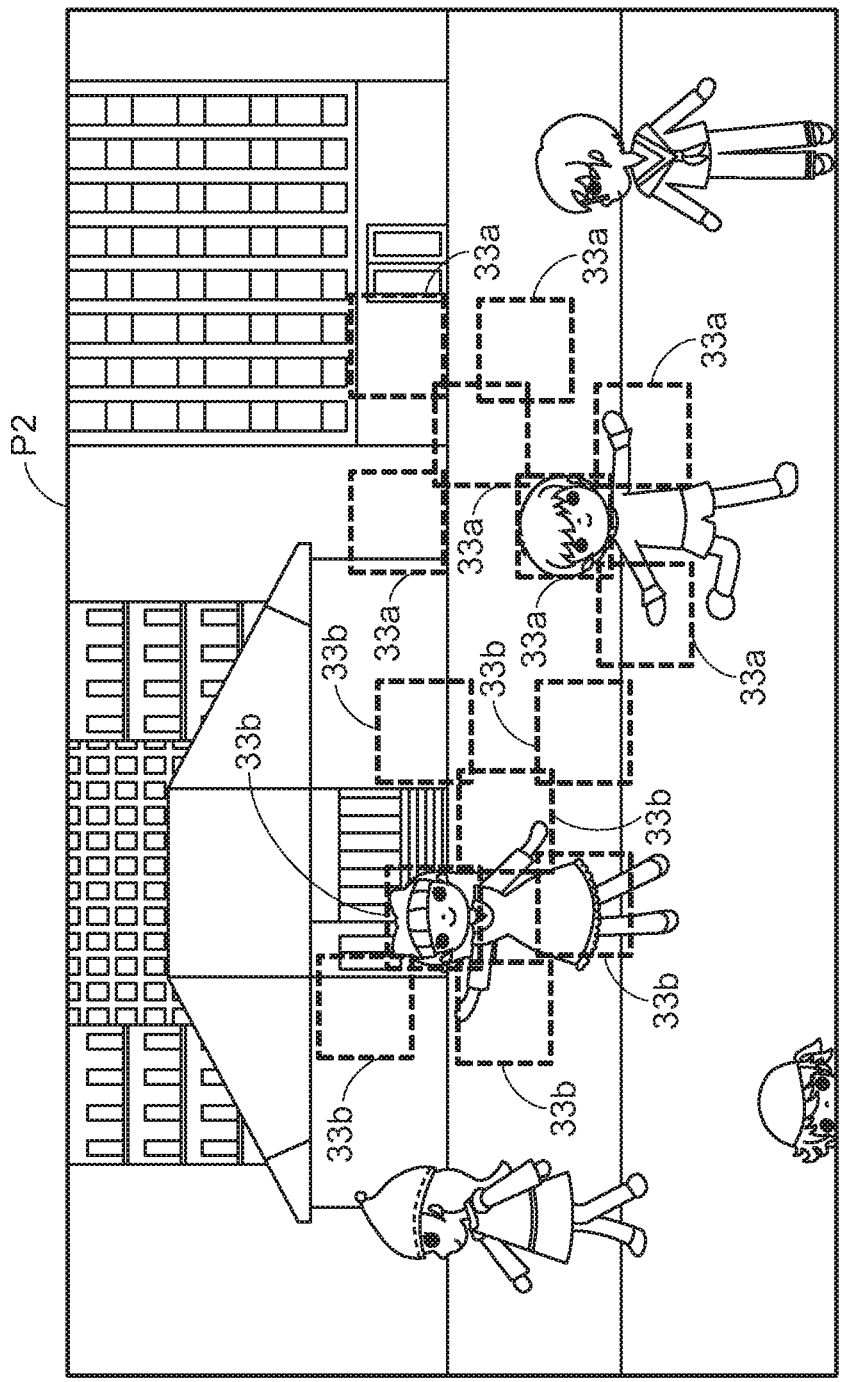
FIG. 10 is a schematic view illustrating plural second tacking frames shown on the next photo image P2 according to an embodiment of the present invention.
Figure 11:
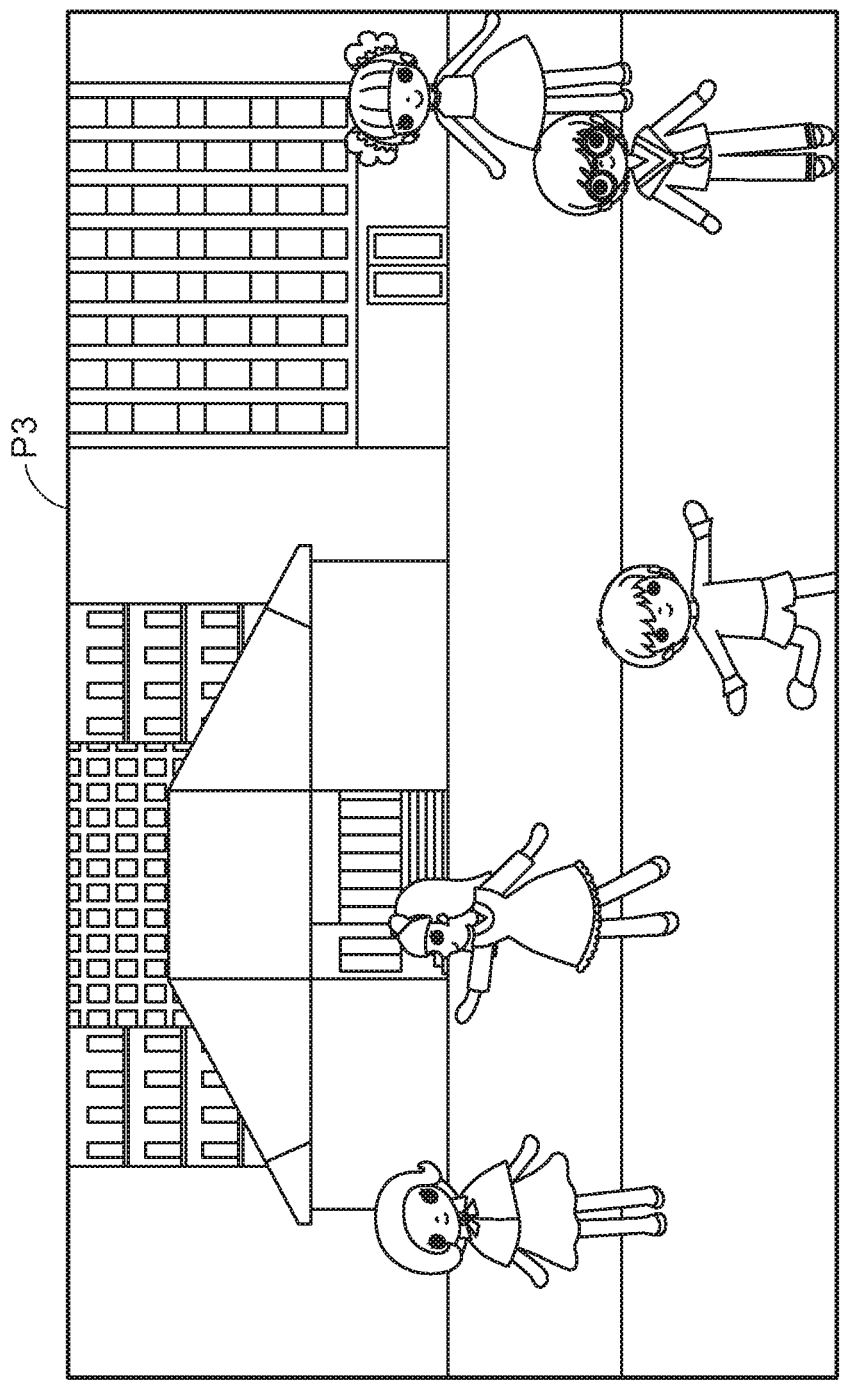
FIG. 11 is a schematic view illustrating a subsequent photo image P3 according to an embodiment of the present invention.
Figure 12:
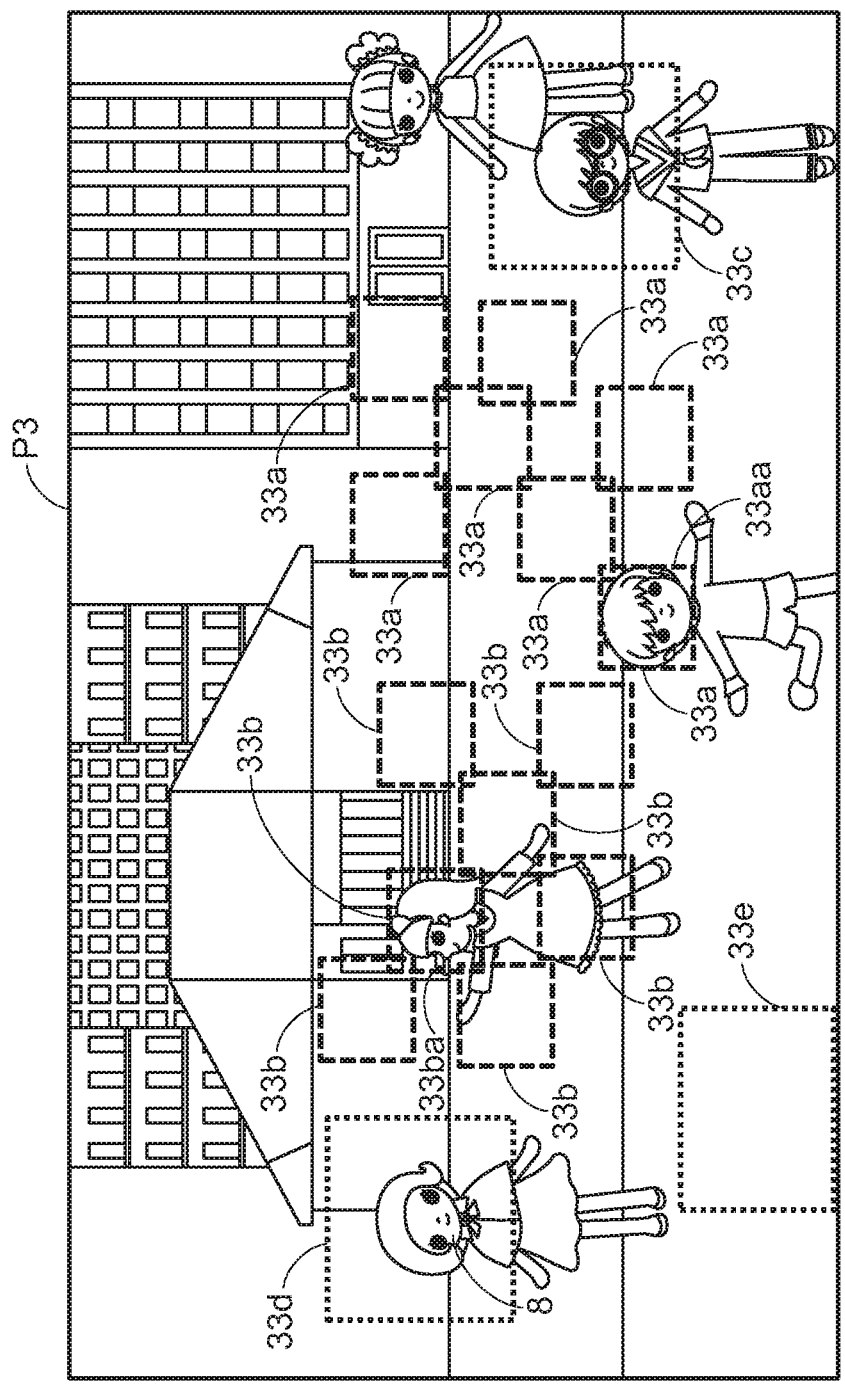
FIG. 12 is a schematic view illustrating the corresponding positions of the plural second tacking frames 33a-33e on the subsequent photo image P3 according to an embodiment of the present invention.

Hereinafter, the step S4 will be illustrated with reference to FIGS. 9A, 9B, 9C, 9D, 10, 11 and 12. FIGS. 9A to 9D are a flowchart illustrating the step S4 of performing a second facial tracking operation in the facial tracking method according to an embodiment of the present invention. FIG. 10 is a schematic view illustrating plural second tacking frames 33a and 33b shown on the next photo image P2 according to an embodiment of the present invention. FIG. 11 is a schematic view illustrating a subsequent photo image P3 according to an embodiment of the present invention. FIG. 12 is a schematic view illustrating the corresponding positions of the plural second tacking frames 33a-33e on the subsequent photo image P3 according to an embodiment of the present invention. The step S4 is performed to judge whether the first face image 3, the second face image 4, the third face image 5, the fourth face image 6 and the fifth face image 7 exist in a subsequent image P3, which is posterior to the next photo image P2.

Firstly, the step S40 is performed to judge whether there is any face image in the next photo image P2 corresponding to the first tracking frames 32aa, 32ba, 32ca, 32da and 32ea with the highest similarities in order to determine the sequent steps. That is, the subsequent steps are determined according to the lost tracking state or the continuous tracking state of the first face image 3, the second face image 4, the third face image 5, the fourth face image 6 and the fifth face image 7.

In this embodiment, the second face image 4 and the third face image 5 are in the continuous tracking state. That is, there are face images in the first tracking frames 32aa and 32ba with the highest similarities. Consequently, in the step S41, plural second tracking frames 33a and 33b are respectively located in the next photo image P2 at the positions around or overlapped with the first tracking frames 32aa and 32ba (see FIG. 10). And the plural second tracking frames 33a and 33b are disposed by taking the first tracking frames 32aa and 32ba as centers, respectively. The number of the plural second tracking frames 33a relative to each first tracking frame 32a is determined according to a weight value of each first tracking frame 32a. Moreover, the weight value is determined according to the similarity between the image included in each first tracking frame 32a and the image included in the first face frame 31 (see FIG. 5). That is, if the similarity between the face image included in the first tracking frame 32a and the face image included in the first face frame 31 (see FIG. 5) is higher, the number of the plural second tracking frames 33a relative to the first tracking frame 32a is higher. On the other hand, if the similarity between the face image included in the first tracking frame 32a and the face image included in the first face frame 31 (see FIG. 5) is lower, the number of the plural second tracking frames 33a relative to the first tracking frame 32a is lower.

In this embodiment, since the similarity between the face image included in the next photo image P2 corresponding to the first tracking frame 32aa and the face image included in the first face frame 31 (see FIG. 5) is the highest, the number of the plural second tracking frames 33a relative to the first tracking frame 32aa is more than the number of the plural second tracking frames 33a relative to any other first tracking frame 32a. Similarly, the number of the plural second tracking frames 33b relative to each first tracking frame 32b is determined according to a weight value of each first tracking frame 32b. In this embodiment, the number of the plural second tracking frames 33b relative to the first tracking frame 32ba is more than the number of the plural second tracking frames 33b relative to any other first tracking frame 32b. It is noted that the positions of the second tracking frames 33a and 33b as shown in FIG. 10 are presented herein for purpose of illustration and description only. The arrangements of the second tracking frames 33a and 33b are not restricted to those shown in the drawings Then, the step S42 is performed to extract a subsequent photo image P3, which is posterior to the next photo image P2. Then, the step S43 is performed to judge whether the subsequent photo image P3 is successfully acquired. If the subsequent photo image P3 fails to be acquired, the flowchart is ended (Step S44). After the subsequent photo image P3 is acquired, the step S45 and the step S441 are simultaneously performed.

In this embodiment, the contents of the subsequent photo image P3 are shown in FIG. 11. It is noted that the subsequent photo image P3 as shown in FIG. 11 is presented herein for purpose of illustration and description only. The number of face images and the states of the face images in the subsequent photo image P3 are not restricted to those shown in the drawings.

Then, in the step S45, plural similarities between the images included in the subsequent photo image P3 corresponding to the plural second tracking frames 33a (see FIG. 12) and the image included in the next photo image P2 corresponding to the first tracking frame 32aa with the highest similarity (see FIG. 8B) are calculated. Similarly, plural similarities between the images included in the subsequent photo image P3 corresponding to the plural second tracking frames 33b (see FIG. 12) and the image included in the next photo image P2 corresponding to the first tracking frame 32ba with the highest similarity (see FIG. 8B) are calculated. The purpose of the step S45 is to search the first face image 3 and the second face image 4.

In this embodiment, the plural similarities between the images included in the subsequent photo image P3 corresponding to the plural second tracking frames 33a and the image included in the next photo image P2 corresponding to the first tracking frame 32aa with the highest similarity are calculated according to the facial textures and the color features of the specified parts under the images included in the subsequent photo image P3 corresponding to the plural second tracking frames 33a and the image included in the next photo image P2 corresponding to the first tracking frame 32aa with the highest similarity. Similarly, the plural similarities between the images included in the subsequent photo image P3 corresponding to the plural second tracking frames 33b and the image included in the next photo image P2 corresponding to the first tracking frame 32ba with the highest similarity are calculated according to the facial textures and the color features of the specified parts under the images included in the subsequent photo image P3 corresponding to the plural second tracking frames 33b and the image included in the next photo image P2 corresponding to the first tracking frame 32*ba* with the highest similarity.

Then, the weight values of all of the plural second tracking frames 33*a* and 33*b* are re-distributed according to the plural similarities. That is, the one of the second tracking frames 33*aa* and 33*ba* (see FIG. 12) with the highest similarity relative to the first tracking frames 32*aa* and 32*ba* (see FIG. 8B) has the highest weight value. The position of the second tracking frame 33*aa* with the highest similarity (see FIG. 12), which has the highest weight value, is the most possible position of the first face image 3 in the subsequent photo image P3. Similarly, the position of the second tracking frame 33*ba* with the highest similarity (see FIG. 12) is the most possible position of the second face image 4 in the subsequent photo image P3.

Then, in the step S46, a face image detection process is performed to detect the images of the subsequent photo image P3 corresponding to the second tracking frames 33*aa* and 33*ba* with the highest similarities (see FIG. 11). In this embodiment, any algorithm (e.g. an Adaboost algorithm) may be utilized in the present invention to detect whether there is any face image in the second tracking frames 33*aa* and 33*ba* with the highest similarities.

Then, the step S47 is performed to judge whether there is any face image in the subsequent photo image P3 corresponding to the second tracking frames 33*aa* and 33*ba* with the highest similarities. As shown in FIG. 12, there is a face image in the subsequent photo image P3 corresponding to the second tracking frame 33*aa* with the highest similarity. Under this circumstance, the face image included in the subsequent photo image P3 corresponding to the second tracking frame 33*aa* with the highest similarity is recognized as the first face image 3. That is, the first face image 3 is successfully searched from the subsequent photo image P3. Then, in the step S48, the first face image 3 is maintained in the continuous tracking state, and the first facial data of the first face image 3 in the database is updated. Moreover, in the step S48, the facial data of the first face image 3 in the database is updated according to the position of the second tracking frame 33*aa*, the facial texture of the face image included in the second tracking frame 33*aa* and the color feature of the specified part under the face image included in the second tracking frame 33*aa*.

Since no face image is included in the subsequent photo image P3 corresponding to the second tracking frame 33*ba* with the highest similarity, it means that the second face image 4 is not searched from the subsequent photo image P3. Then, in the step S49, the tracking state of the second face image 4 is changed from the continuous tracking state to the lost tracking state, and a second facial data of the second face image 4 in the database is updated. At this moment, the second face image 4 may be not shown on the subsequent photo image P3 temporarily because the posture is changed or the second face image 4 is hidden. Consequently, the second face image 4 needs to be continuously searched from the remaining subsequent photo images.

By the way, if the weight values of some tracking frames are too low, the probability of finding the first face image 3 or the second face image 4 from these tracking frames is very low. Under this circumstance, these tracking frames may be deleted and no longer used.

Hereinafter, the step S441 will be described in more details. Since the third face image 5, the fourth face image 6 and the fifth face image 7 are not found in the next photo image P2 after the first facial tracking operation (i.e. the step S3) is performed, the weight values of the plural first tracking frames 32*c*, 32*d* and 32*e* of the next photo image P2 fail to be continuously used in the subsequent photo image P3 to search the third face image 5, the fourth face image 6 and the fifth face image 7.

In the step S441, a face image detection process is performed to detect the images in the subsequent photo image P3 at the positions corresponding to the previous positions of the third face image 5, the fourth face image 6 and the fifth face image 7. In this embodiment, the previous positions of the third face image 5, the fourth face image 6 and the fifth face image 7 are the positions of the third face frame 51, the forth face frame 61 and the fifth face frame 71 of the current photo image P1 (see FIG. 5). Consequently, in the step S441, a face image detection process is performed to detect a local area of the subsequent photo image P3, wherein the range of the local area (i.e. the second tracking frame 33*c* as shown in FIG. 12) is larger than the range of the third face frame 51. And a center of the local area is corresponding to the third face frame 51 of the current photo image P1. Similarly, in the step S441, a face image detection process is performed to detect a local area of the subsequent photo image P3 corresponding to the fourth face frame 61, wherein the range of the local area (i.e. the second tracking frame 33*d* as shown in FIG. 12) is larger than the range of the fourth face frame 61. And a center of the local area is corresponding to the fourth face frame 61. Similarly, in the step S441, a face image detection process is performed to detect a local area of the subsequent photo image P3 corresponding to the fifth face frame 71, wherein the range of the local area (i.e. the second tracking frame 33*e* as shown in FIG. 12) is larger than the range of the fifth face frame 71. And a center of the local area is corresponding to the fifth face frame 71.

Then, the step S451 is performed to judge whether there is any face image in the second tracking frames 33*c*, 33*d* and 33*e*. Since no face image in the second tracking frame 33*e* is detected in the step S441 (see FIG. 12), the fifth face image 7 is still in the lost tracking state. If the fifth face image 7 is in the lost tracking state for a long time, it means that the fifth face image 7 is possibly left from the front of the electronic billboard 2. Under this circumstance, it is no longer necessary to search the fifth face image 7 from the remaining subsequent photo images.

In other words, the step S461 is performed to judge whether the number of times the fifth face image 7 is in the lost tracking state is larger than a second threshold value. If the number of times the fifth face image 7 is in the lost tracking state is larger than the second threshold value, the step S471 is performed. In the step S471, the tracking state of the fifth face image 7 is changed to the stop tracking state, and the facial data of the fifth face image 7 in the database is updated. From now on, the position of the fifth face image 7 is no longer searched from the remaining subsequent photo images. On the other hand, if the number of times the fifth face image 7 is in the lost tracking state is not been larger than the second threshold value (Step S461), the fifth face image 7 may be not shown temporarily because the posture is changed or the fifth face image 7 is hidden. Consequently, the fifth face image 7 needs to be continuously searched from the remaining subsequent photo images. Then, in the step S481, the fifth face image 7 is maintained in the lost tracking state, and the facial data of the fifth face image 7 in the database is updated. In other words, it only simply indicates that the fifth face image 7 is temporarily not found in the subsequent photo image P3.

On the other hand, face images are detected in the second tracking frames 33*c* and 33*d* in the step S441. Since the third face image 5 and the fourth face image 6 of the next photo image P2 are in the lost tracking state, it is uncertain whether the images in the second tracking frames 33c and 33d of the subsequent photo image P3 are the third face image 5 and the fourth face image 6, respectively.

Then, the step S462 is performed. That is, the similarity between the third face image 5 and the face image included in the second tracking frame 33c is calculated according to the facial texture in order to confirm whether the face image included in the second tracking frame 33c is the third face image 5. Similarly, the similarity between the fourth face image 6 and the face image included in the second tracking frame 33d is calculated according to the facial texture in order to confirm whether the face image included in the second tracking frame 33d is the fourth face image 6.

After the step S462, the step S472 is performed to judge whether the facial texture similarity is larger than a third threshold value. In this embodiment, the facial texture similarity between the third face image 5 and the face image included in the second tracking frame 33c is larger than the third threshold value. Consequently, the face image included in the second tracking frame 33c and the third face image 5 are considered to belong to the same person. Moreover, the position of the second tracking frame 33c is the position where the third face image 5 exists in the subsequent photo image P3.

Then, the step S482 is performed. In the step S482, the tracking state of the third face image 5 is changed to the continuous tracking state, and the facial data of the third face image 5 in the database is updated. For example, in the step S482, the facial data of the third face image 5 in the database is updated according to the position of the second tracking frame 33c, the facial texture of the face image included in the second tracking frame 33c and the color feature of the specified part under the face image included in the second tracking frame 33c.

In this embodiment, the facial texture similarity between the face image included in the second tracking frame 33d and the fourth face image 6 is smaller than the third threshold value. Consequently, the face image included in the second tracking frame 33d and the fourth face image 6 do not belong to the same person.

That is, the face image included in the second tracking frame 33d is an additional face image (e.g. a sixth face image 8). Then, the step S483 is performed to record the facial data of the sixth face image 8 into the database. The facial data of the sixth face image 8 include but are not limited to the position of the sixth face image 8 in each photo image, the tracking state of the sixth face image 8 in each photo image, the number of the photo images the sixth face image 8 exists, a facial texture of the sixth face image 8 and a color feature of a specified part under the sixth face image 8. Moreover, the position of the sixth face image 8 in the subsequent photo image P3 is the position of the second tracking frame 33d, and the tracking state of the sixth face image 8 in the subsequent photo image P3 is the continuous tracking state.

In this embodiment, the fourth face image 6 is still in the lost tracking state. If the fourth face image 6 is in the lost tracking state for a long time, it means that the fourth face image 6 is possibly left from the front of the electronic billboard 2. Under this circumstance, it is no longer necessary to search the fourth face image 6 from the remaining subsequent photo images.

Then, the step S484 is performed to judge whether the number of times the fourth face image 6 is in the lost tracking state is larger than a second threshold value. If the number of times the fourth face image 6 is in the lost tracking state is larger than the second threshold value in the step S484, the position of the fourth face image 6 is no longer searched from the remaining subsequent photo images. Consequently, the step S485 is performed. In the step S485, the tracking state of the fourth face image 6 is changed to the stop tracking state, and the facial data of the fourth face image 6 in the database is updated. On the other hand, if the number of times the fourth face image 6 is in the lost tracking state is not larger than the second threshold value (Step S484), the fourth face image 6 may be not shown temporarily because the posture is changed or the fourth face image 6 is hidden. Consequently, the fourth face image 6 needs to be continuously searched from the remaining subsequent photo images. In the step S486, the fourth face image 6 is maintained in the lost tracking state, and the facial data of the fourth face image 6 in the database is updated.

After the step S4 of performing the second facial tracking operation on the fixed number of subsequent photo images P3~Pn, the subsequent photo image Pn is subjected to the second facial detecting operation (step S5). That is, after the step of searching whether the face images of the database in the continuous tracking state or the lost tracking state exist in the subsequent photo image Pn is performed, the step of detecting whether there is any new face image different from the face images in the database exists in the subsequent photo image Pn will be performed. If there is any new face image, the new face image may be also searched from the subsequent photo image Pn+a, wherein a is an integer.

Figure 13:
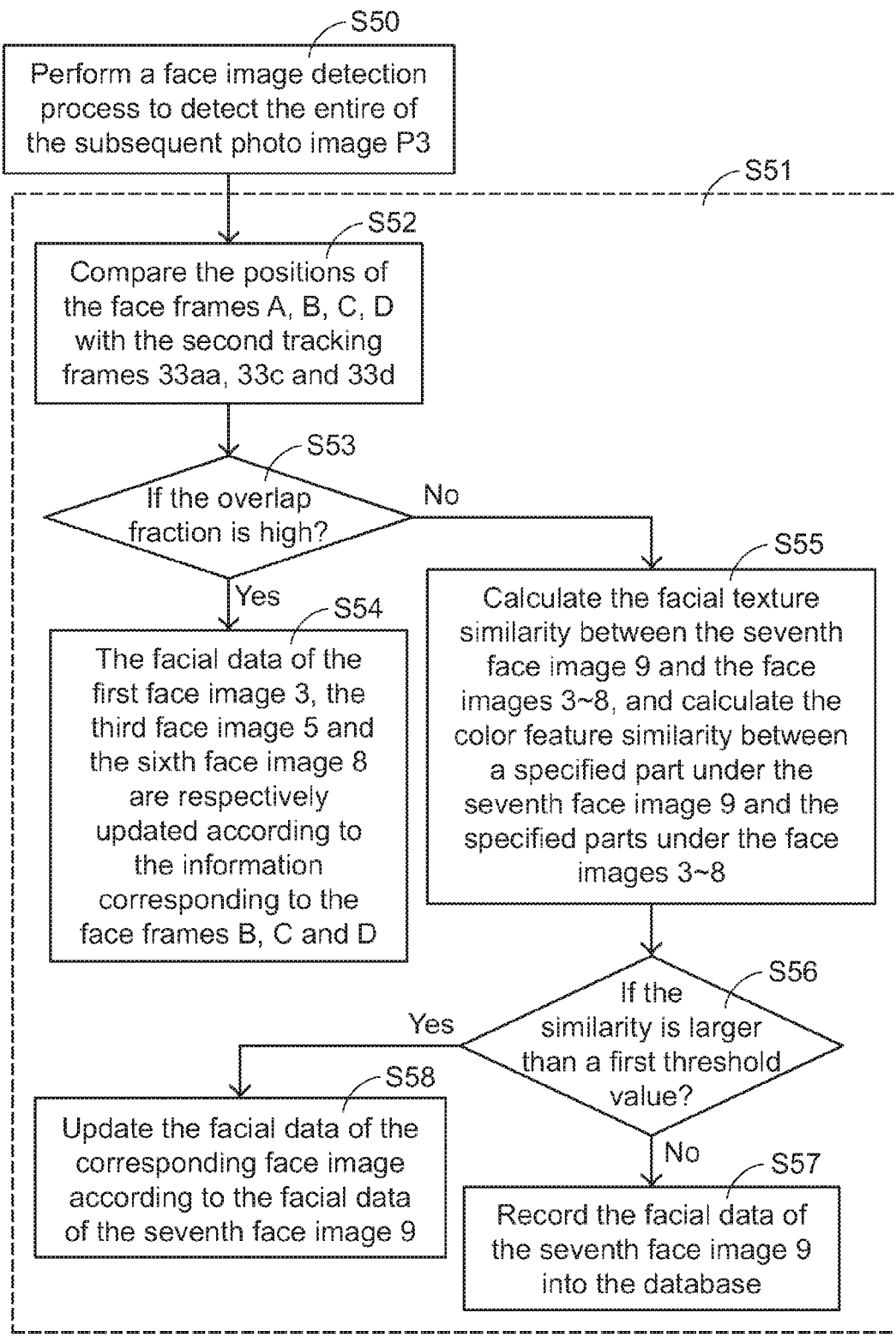
FIG. 13 is a flowchart illustrating the step S5 of performing a second facial detecting operation in the facial tracking method according to an embodiment of the present invention.
Figure 14:
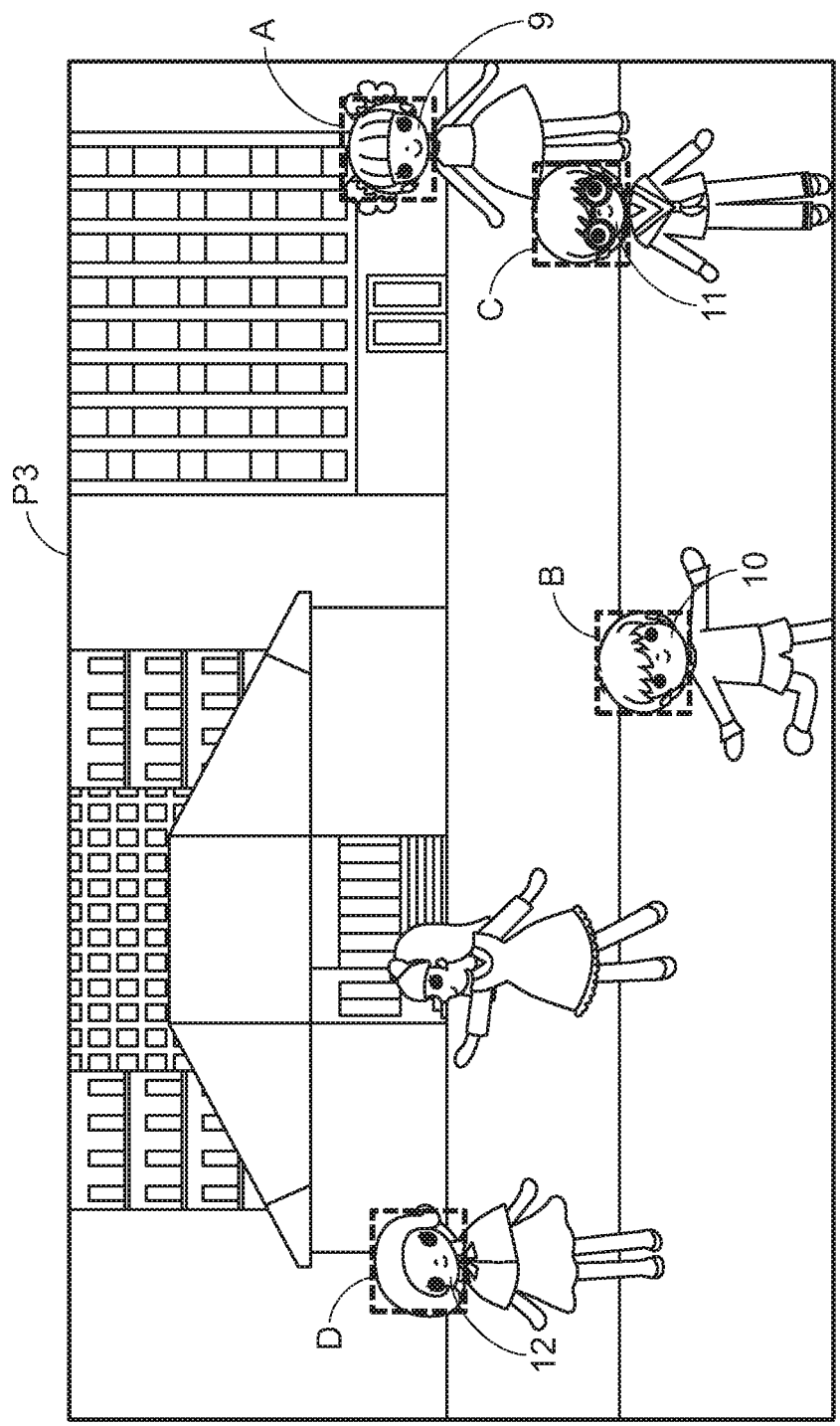
FIG. 14 is a schematic view illustrating plural face images detected by the step S5 of performing the second facial detecting operation on the subsequent photo image P3 according to an embodiment of the present invention.

Hereinafter, the step S5 of performing the second facial detecting operation on the subsequent photo image P3 will be described in more details with reference to FIGS. 13 and 14. FIG. 13 is a flowchart illustrating the step S5 of performing a second facial detecting operation in the facial tracking method according to an embodiment of the present invention. FIG. 14 is a schematic view illustrating plural face images detected by the step S5 of performing the second facial detecting operation on the subsequent photo image P3 according to an embodiment of the present invention.

Firstly, in the step S50, a face image detection process is performed to detect the entire subsequent photo image P3. In this embodiment, any applicable algorithm (e.g. an Adaboost algorithm) may be utilized in the present invention to detect the entire subsequent photo image P3 in order to obtain potential candidate regions for detecting face images. After the adjacent candidate regions are deleted or merged, the remaining candidate regions are the regions containing face images. In this embodiment, as shown in FIG. 14, a seventh face image 9, an eighth face image 10, an ninth face image 11 and a tenth face image 12 in the subsequent photo image P3 are detected.

Then, a comparison process S51 is performed to judge whether the face images 9~12 comply with all face images in the database. For example, in this embodiment, all face images in the database contain the first face image 3, the second face image 4, the third face image 5, the fourth face image 6, the fifth face image 7 and the sixth face image 8.

As mentioned above, the first face image 3 is included in the second tracking frame 33aa of the subsequent photo image P3, the third face image 5 is included in the second tracking frame 33c of the subsequent photo image P3, and the sixth face image 8 is included in the second tracking frame 33d of the subsequent photo image P3. Consequently, the positions of a seventh face frame A including the seventh face image 9, an eighth face frame B including the eighth face image 10, a ninth face frame C including the ninth face image 11 and a tenth face frame D including the tenth face image 12 (see FIG. 14) are compared with the positions of the second tracking frames 33aa, 33c and 33d (see FIG. 12) (Step S52).

Firstly, the position of the seventh face frame A is compared with the positions of the first face image 3, the third face image 5 and the sixth face image 8 of the subsequent photo image P3 which are in the continuous tracking state. In this embodiment, the overlap fraction between the position of the seventh face frame A and each position of the second tracking frames 33aa, 33c and 33d is not high.

Then, the position of the eighth face frame B is compared with the positions of the first face image 3, the third face image 5 and the sixth face image 8 of the subsequent photo image P3 which are in the continuous tracking state (i.e. the positions of the second tracking frames 33aa, 33c and 33d). In this embodiment, the overlap fraction between the position of the eighth face frame B and the position of the second tracking frame 33aa is high (see FIG. 12 and F14). Consequently, the judging result of the step S53 indicates that the eighth face image 10 and the first face image 3 belong to the same person. Then, the step S54 is performed to update the facial data of the first face image 3 according to the facial data of the eighth face image 10.

Moreover, in the step S54, the position of the first face image 3, the facial texture of the first face image 3 and the color feature of the specified part under the first face image 3 are updated according to the position of the eighth face frame B, the facial texture of the eighth face image 10 and the color feature of the specified part under the eighth face image 10. Then, the position of the ninth face frame C is compared with the positions of the third face image 5 and the sixth face image 8 of the subsequent photo image P3 which are in the continuous tracking state. In this embodiment, the overlap fraction between the position of the third face image 5 in the subsequent photo image P3 (i.e. the position of the second tracking frame 33c) and the position of the ninth face frame C is high. Consequently, the judging result of the step S53 indicates that the ninth face image 11 and the third face image 5 belong to the same person. Then, the step S54 is performed to update the facial data of the third face image 5 according to the facial data of the ninth face image 11. Afterwards, the position of the tenth face frame D is compared with the positions of the sixth face image 8 of the subsequent photo image P3 which is in the continuous tracking state. In this embodiment, the overlap fraction between the position of the sixth face image 8 in the subsequent photo image P3 (i.e. the position of the second tracking frame 33d) and the position of the tenth face frame D is high. Consequently, the judging result of the step S53 indicates that the tenth face image 12 and the sixth face image 8 belong to the same person. Then, the step S54 is performed to update the facial data of the sixth face image 8 according to the facial data of the tenth face image 12.

Please refer to FIG. 13 and FIG. 14 again. Since the overlap fraction between the position of the seventh face frame A and each position of the second tracking frames 33aa, 33c and 33d is not high, it is unable to confirm whether the seventh face image 9 and any of the face images 3-8 belong to the same person. Under this circumstance, since the overlap fraction is not high according to the judging result of the step S53, the step S55 is performed to calculate the facial texture similarity between the seventh face image 9 and all of the face images of the database and calculate the color feature similarity between a specified part under the seventh face image 9 and the specified parts under all of the face images of the database. In this embodiment, all of the face images of the database include the first face image 3, the second face image 4, the third face image 5, the fourth face image 6, the fifth face image 7 and the sixth face image 8. In a preferred embodiment, the final similarity value is the weighted sum of the facial texture similarity and the color feature similarity.

Then, the step S56 is performed to judge whether the similarity is larger than a first threshold value. In this embodiment, the similarity between the seventh face image 9 and any of the face images 3-8 is not larger than the first threshold value. Consequently, the seventh face image 9 and any of the face images 3~8 do not belong to the same person. Under this circumstance, since the seventh face image 9 is found at the first time, the step S57 is performed to record the facial data of the seventh face image 9 into the database. Meanwhile, the seventh face image 9 is in the continuous tracking state. The facial data of the seventh face image 9 include but are not limited to the position of the seventh face image 9 in each photo image, the tracking state of the seventh face image 9 in each photo image, the number of the photo images the seventh face image 9 exists, a facial texture of the seventh face image 9 and a color feature of a specified part under the seventh face image 9.

On the other hand, if the facial texture similarity and the color feature similarity between the seventh face image 9 and any of the face images 3~8 is larger than the first threshold value, the judging result of the step S56 indicates that the seventh face image 9 and the corresponding face image belong to the same person. Consequently, the step S58 is performed to update the facial data of the corresponding face image according to the facial data of the seventh face image 9. In the step S58, the position of the corresponding face image in the subsequent photo image P3, the facial texture of the corresponding face image and the color feature of the specified part under the corresponding face image are updated according to the position of the seventh face frame A, the facial texture of the seventh face image 9 and the color feature of the specified part under the seventh face image 9.

In the above embodiments, the step S5 of performing the second facial detecting operation is illustrated by detecting four face images in the subsequent photo image P3. Regardless of how many face images are detected, the steps of processing these face images are identical.

After the above steps are completed, the facial tracking method of the present invention will continuously search whether all face images stored in the database exit in the fixed number of subsequent photo images P4~Pm. Moreover, after the facial tracking operations on the fixed number of subsequent photo images P4~Pm are performed, a facial detecting operation is performed on the subsequent photo image Pm.

Figure 15A:
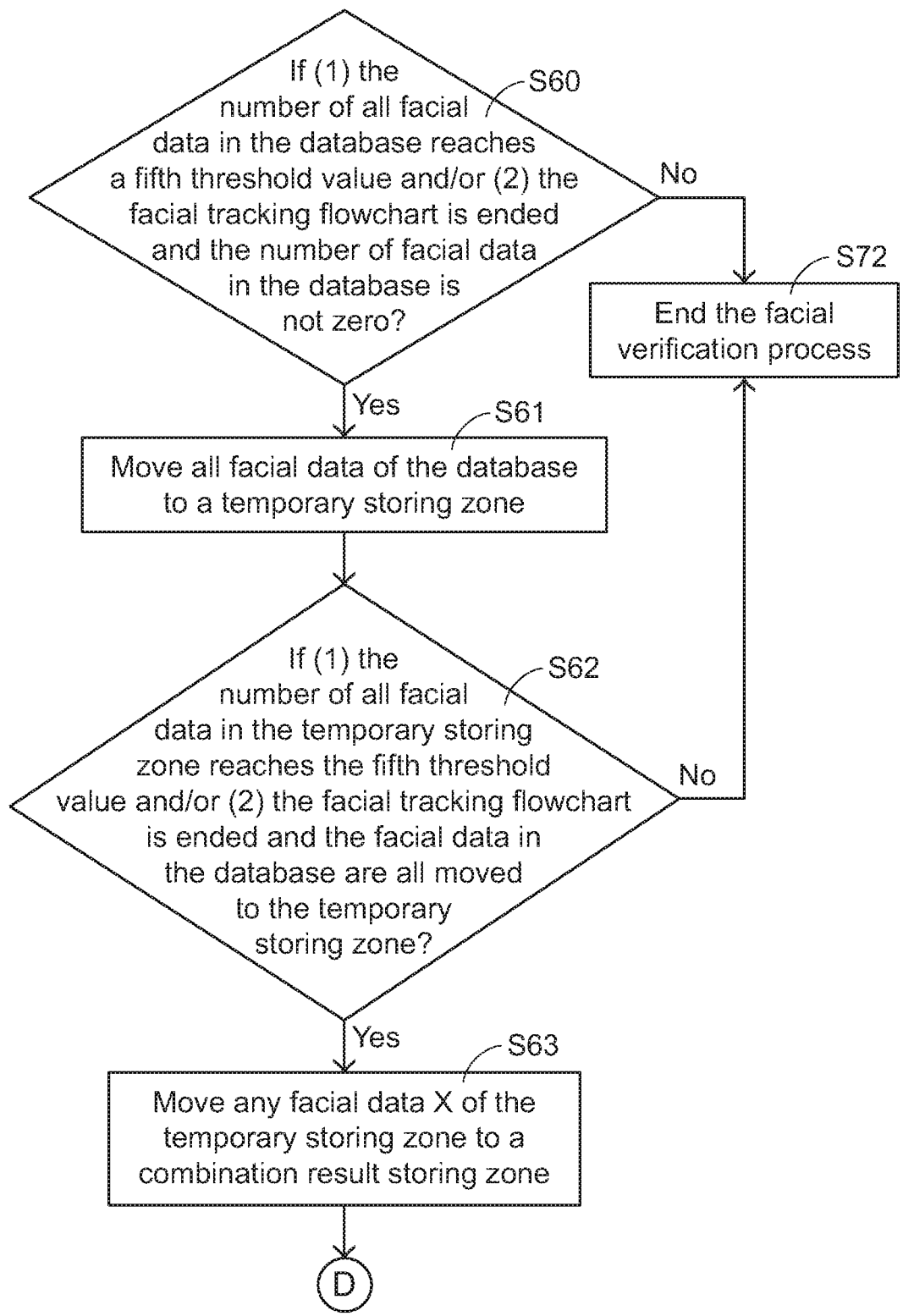
FIGS. 15A and 15B schematically illustrate a flowchart of the S6 of performing a facial verification process in the facial tracking method according to an embodiment of the present invention.
Figure 15B:
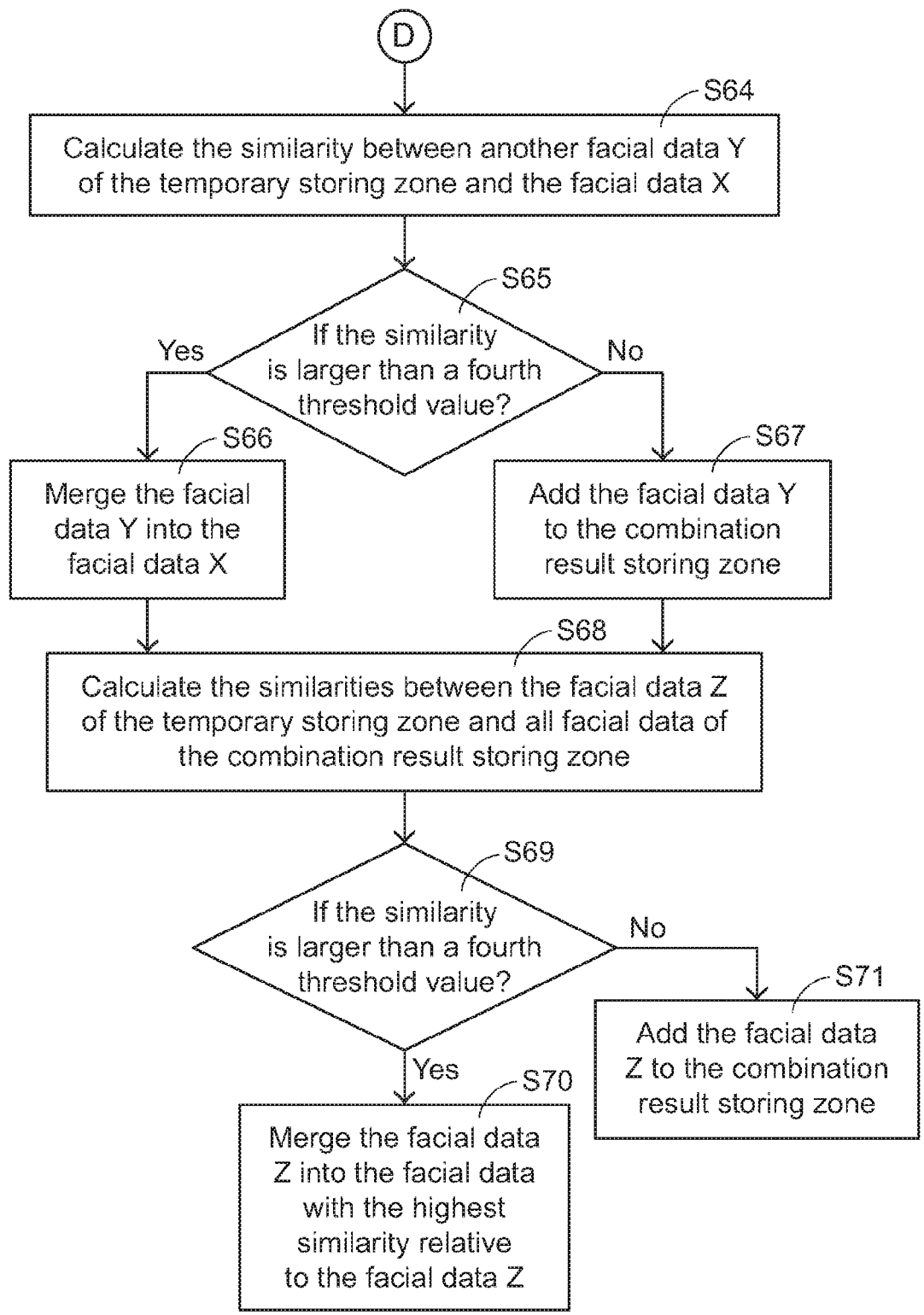

Moreover, in some embodiments, the facial tracking method of the present invention further comprises a step S6 of performing a facial verification process for checking whether any facial data in the database is duplicated. FIGS. 15A and 15B schematically illustrate a flowchart of the step S6 of performing a facial verification process in the facial tracking method according to an embodiment of the present invention.

Firstly, the step S60 is performed to judge whether any of the following two conditions is satisfied: (1) the number of all facial data in the database reaches a fifth threshold value; and (2) the facial detecting and tracking flowchart is ended and the number of facial data in the database is not zero. If any of the condition (1) and the condition (2) of the step S60 is satisfied, the step S61 is performed to move all facial data of the database to a temporary storing zone.

Then, the step S62 is performed to judge whether any of the following two conditions is satisfied: (1) the number of all facial data in the temporary storing zone reaches the fifth threshold value; and (2) the facial detecting and tracking flowchart is ended and the facial data in the database are all moved to the temporary storing zone. If any of the condition (1) and the condition (2) of the step S62 is satisfied, the step S63 is performed to move any facial data X of the temporary storing zone to a combination result storing zone. For example, the facial data X may be a first facial data in the temporary storing zone.

Then, in the step S64, the similarity between another facial data Y of the temporary storing zone and the facial data X is calculated. Then, the step S65 is performed to judge whether the similarity between another facial data Y of the temporary storing zone and the facial data X is larger than a fourth threshold value. If the similarity is larger than the fourth threshold value, the step S66 is performed to merge the facial data Y into the facial data X. If the similarity is smaller than the fourth threshold value, the step S67 is performed to add the facial data Y to the combination result storing zone.

Then, in the step S68, the similarities between another facial data Z of the temporary storing zone and all facial data of the combination result storing zone are calculated. Then, the step S69 is performed to judge whether the similarities between the facial data Z of the temporary storing zone and any facial data of the combination result storing zone is larger than the fourth threshold value. If the similarity is larger than the fourth threshold value, the step S70 is performed to merge the facial data Z into the facial data with the highest similarity relative to the facial data Z. If the similarity is smaller than the fourth threshold value, the step S71 is performed to add the facial data Z to the combination result storing zone.

The steps of acquiring any facial data from the temporary storing zone and comparing the acquired facial data with all facial data of the combination result storing zone are repeatedly done until all facial data of the temporary storing zone are merged into or added to the combination result storing zone. Meanwhile, it is confirmed that no facial data is duplicated.

Afterwards, all facial data of the combination result storing zone are outputted. Under this circumstance, the number of persons staying in front of the electronic billboard 2 in the set time period can be determined. Moreover, according to the number of the photo images each face image exists, the staying time of each person can be realized.

On the other hand, if the conditions of the step S60 or the step S62 are not satisfied, the facial verification process is ended (Step S72).

It is noted that the sequence of the above steps of the facial tracking method according to the present invention are not stringently restricted if the efficacy of the present invention can be achieved. Moreover, these steps are not necessarily consecutive, and some additional steps may be interposed between these steps.

From the above descriptions, the present invention provides a facial tracking method. After a facial detecting operation is performed to detect at least one face image in an entire photo image, the possible occurrence positions of the face image are tracked from a fixed number of subsequent photo images according to the similarities relative to the tracking frames, and the possible occurrence positions of the face image are further detected to confirm whether there is any face image. Afterwards, a facial detecting operation is performed on the entire of the last photo image of the fixed number of subsequent photo images. Since not all of the photo images are subjected to the facial detecting operation, the overall processing speed of the facial tracking method is enhanced.

Moreover, the facial tracking method of the present invention further comprises a facial verification process. Once the capacity of the database reaches a critical capacity, the facial data are moved to the temporary storing zone. In addition, once the capacity of the temporary storing zone reaches a critical capacity, the facial data are moved to the combination result storing zone for comparison. Consequently, during the facial tracking operations are performed, even if the database is fully occupied, the facial data are not deleted. Under this circumstance, the accuracy of the final result is largely enhanced. From the above descriptions, the present invention provides a method for tracking plural face images in the same region at a fast computing speed so as to overcome the drawbacks of the conventional method.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A facial tracking method for detecting and tracking plural face images within a specified region in a set time period, said facial tracking method comprising steps of:

performing an image acquiring operation for continuously shooting said specified region at the same viewing angle, thereby acquiring plural photo images;

performing a first facial detecting operation for extracting a current photo image from said plural photo images, and detecting whether there is any face image in the entire of said current photo image, wherein if a first face image is included in said current photo image, a first facial data corresponding to said first face image is recorded into a database; and performing a first facial tracking operation for determining whether said first face image exists in a next photo image, which is posterior to said current photo image, wherein said step of performing said first facial tracking operation comprises sub-steps of locating plural first tracking frames in said current photo image by taking a first face frame including said first face image as a center, extracting said next photo image, calculating plural similarities between images included in said next photo image corresponding to said plural first tracking frames and said image included in said first face frame, and detecting whether there is any face image in said next photo image corresponding to said first tracking frame with the highest similarity relative to said image included in said first face frame, wherein if a face image is included in said next photo image corresponding to said first tracking frame with the highest similarity, said face image is recognized as said first face image, and said first facial data is updated according to information corresponding to said first tracking frame with the highest similarity, wherein if no face image is included in said next photo image corresponding to said first tracking frame with the highest similarity, said first face image is considered to be excluded from said next photo image, and said first facial data is updated, wherein said first facial data comprises a position of said first face image in each photo image, a tracking state of said first face image in each photo image, the number of said photo images said first face image exists, a facial texture of said first face image, and a color feature of a specified part under said first face image, wherein said tracking state includes a continuous tracking state, a lost tracking state or a stop tracking state, wherein if said first face image exists in a specified photo image, said first face image is in said continuous tracking state, wherein if said first face image does not exist in said specified photo image, said first face image is in said lost tracking state, wherein if said first face image does not exist in several consecutive photo images, said first face image is in said stop tracking state, wherein after said first facial tracking operation is performed, said facial tracking method further comprises a step of performing a second facial tracking operation for determining whether said first face image exists in a subsequent photo image, which is posterior to said next photo image, wherein if no face image is included in said next photo image corresponding to said first tracking frame with the highest similarity, said step of performing said second facial tracking operation comprises sub-steps of:

extracting said subsequent photo image;

locating a second tracking frame with a local area in said subsequent photo image, wherein a center of said local area is corresponding to said first face frame of said current photo image;

detecting whether there is any face image in said second tracking frame of said subsequent photo image;

if no face image is included in said second tracking frame, confirming that said first face image is not included in said subsequent photo image, and further judging whether the number of times said first face image is in said lost tracking state is larger than a second threshold value, wherein if the number of times said first face image is in said lost tracking state is larger than a second threshold value, said first face image is no longer searched from remaining photo images;

if a face image is included in said second tracking frame, calculating a facial texture similarity between said first face image and said face image included in said second tracking frame;

if said facial texture similarity between said first face image and said face image included in said second tracking frame is larger than a third threshold value, confirming that said first face image and said face image included in said second tracking frame belong to the same person, and updating said first facial data according to information corresponding to said second tracking frame;

if said facial texture similarity between said first face image and said face image included in said second tracking frame is smaller than said third threshold value, confirming that said first face image is not included in said subsequent photo image, and judging whether the number of times said first face image is in said lost tracking state is larger than said second threshold value, wherein if the number of times said first face image is in said lost tracking state is larger than said second threshold value, said first face image is no longer searched from said remaining photo images; and if said facial texture similarity between said first face image and said face image included in said second tracking frame is smaller than said third threshold value, confirming that said face image included in said second tracking frame is a third face image different from said first face image, and recording a third facial data of said third face image into said database.

2. The facial tracking method according to claim 1, wherein if a face image is included in said next photo image corresponding to said first tracking frame with the highest similarity, said step of performing said second facial tracking operation comprises sub-steps of:

locating plural second tracking frames in said next photo image by taking each of said plural first tracking frames as a center, wherein the number of said plural second tracking frames relative to each of said plural first tracking frames is determined according to a similarity between said image included in each of said plural first tracking frame and said first face image;

extracting a subsequent photo image, which is posterior to said next photo image;

calculating plural similarities between images included in said subsequent photo image corresponding to said plural second tracking frames and said image included in said next photo image corresponding to said first tracking frame with the highest similarity; and detecting whether there is any face image in said subsequent photo image corresponding to said second tracking frame with the highest similarity relative to said first tracking frame with the highest similarity, wherein if a face image is included in said subsequent photo image corresponding to said second tracking frame with the highest similarity, said face image is recognized as said first face image, and said first facial data is updated according to information corresponding to said second tracking frame with the highest similarity, wherein if no face image is included in said subsequent photo image corresponding to said second tracking frame with the highest similarity, said first face image is considered to be excluded from said subsequent photo image, and said first facial data is updated.

3. The facial tracking method according to claim 2, wherein after said second facial tracking operation is performed, said facial tracking method further comprises a step of performing a second facial detecting operation for detecting whether there is any additional face image in the entire of said subsequent photo image.

4. The facial tracking method according to claim 3, wherein during said second facial detecting operation is performed, if a second face image is included in said subsequent photo image and said face image is included in said subsequent photo image corresponding to said second tracking frame with the highest similarity, a comparison process is performed to judge whether said second face image and said first face image belong to the same person, wherein said comparison process comprises steps of:

comparing a position of a second face frame including said second face image with a position of said second tracking frame with the highest similarity;

if said position of said second face frame and said position of said second tracking frame with the highest similarity are highly overlapped, confirming that said second face image and said first face image belong to the same person, and updating said first facial data according to a second facial data of said second face image;

if said position of said second face frame and said position of said second tracking frame with the highest similarity are not highly overlapped, calculating a facial texture similarity between said second face image and said first face image and a color feature similarity between a specified part under said second face image and a specified part under said first face image;

if said facial texture similarity and said color feature similarity between said second face image and said first face image are both smaller than a first threshold value, confirming that said second face image and said first face image do not belong to the same person, and recording said second facial data of said second face image into said database; and if said facial texture similarity and said color feature similarity between said second face image and said first face image are both higher than said first threshold value, confirming that said second face image and said first face image belong to the same person, and updating said first facial data according to said second facial data of said second face image.

5. The facial tracking method according to claim 4, wherein said second facial data comprises a position of said second face image in each photo image, a tracking state of said second face image in each photo image, the number of said photo images said second face image exists, a facial texture of said second face image, and a color feature of a specified part under said second face image, wherein said tracking state includes a continuous tracking state, a lost tracking state or a stop tracking state, wherein if said second face image exists in a specified photo image, said second face image is in said continuous tracking state, wherein if said second face image does not exist in said specified photo image, said second face image is in said lost tracking state, wherein if said second face image does not exist in several consecutive photo images, said second face image is in said stop tracking state.

6. The facial tracking method according to claim 3, wherein during said second facial detecting operation is performed, if a second face image is included in said subsequent photo image and no face image is included in said subsequent photo image corresponding to said second tracking frame with the highest similarity, a comparison process is performed to judge whether said second face image and said first face image belong to the same person, wherein said comparison process comprises steps of:
 calculating a facial texture similarity between said second face image and said first face image and a color feature similarity between a specified part under said second face image and a specified part under said first face image;
 if said facial texture similarity and said color feature similarity between said second face image and said first face image are both smaller than a first threshold value, confirming that said second face image and said first face image do not belong to the same person, and recording a second facial data of said second face image into said database; and
 if said facial texture similarity and said color feature similarity between said second face image and said first face image are both higher than said first threshold value, confirming that said second face image and said first face image belong to the same person, and updating said first facial data according to said second facial data of said second face image.

7. The facial tracking method according to claim 6, wherein said second facial data comprises a position of said second face image in each photo image, a tracking state of said second face image in each photo image, the number of said photo images said second face image exists, a facial texture of said second face image, and a color feature of a specified part under said second face image, wherein said tracking state includes a continuous tracking state, a lost tracking state or a stop tracking state, wherein if said second face image exists in a specified photo image, said second face image is in said continuous tracking state, wherein if said second face image does not exist in said specified photo image, said second face image is in said lost tracking state, wherein if said second face image does not exist in several consecutive photo images, said second face image is in said stop tracking state.

8. The facial tracking method according to claim 1, wherein said third facial data comprises a position of said third face image in each photo image, a tracking state of said third face image in each photo image, the number of photo images said second face image exists, a facial texture of said third face image, and a color feature of a specified part under said third face image, wherein said tracking state include a continuous tracking state, a lost tracking state or a stop tracking state, wherein if said third face image exists in a specified photo image, said third face image is in said continuous tracking state, wherein if said third face image does not exist in said specified photo image, said third face image is in said lost tracking state, wherein if said third face image does not exist in several consecutive photo images, said third face image is in said stop tracking state.

9. The facial tracking method according to claim 8, wherein after said second facial tracking operation is performed, said facial tracking method further comprises a step of performing a second facial detecting operation for detecting whether there is any additional face image in the entire of said subsequent photo image.

10. The facial tracking method according to claim 9, wherein during said second facial detecting operation is performed, if a second face image in said subsequent photo image is detected and said face image included in said second tracking frame and said first face image belong to the same person, a comparison process is performed to judge whether said second face image and said first face image belong to the same person, wherein said comparison process comprises steps of:
 comparing a position of a second face frame including said second face image with a position of said second tracking frame;
 if said position of said second face frame and said position of said second tracking frame are highly overlapped, confirming that said second face image and said first face image belong to the same person, and updating said first facial data according to a second facial data of said second face image;
 if said position of said second face frame and said position of said second tracking frame are not highly overlapped, calculating a facial texture similarity between said second face image and said face image included in said second tracking frame and a color feature similarity between a specified part under said second face image and a specified part under said face image included in said second tracking frame;
 if said facial texture similarity and said color feature similarity between said second face image and said face image included in said second tracking frame are both smaller than a first threshold value, confirming that said second face image and said first face image do not belong to the same person, and recording said second facial data of said second face image into said database; and
 if said facial texture similarity and said color feature similarity between said second face image and said face image included in said second tracking frame are both higher than said first threshold value, confirming that said second face image and said first face image belong to the same person, and updating said first facial data according to said second facial data of said second face image.

11. The facial tracking method according to claim 10, wherein said second facial data comprises a position of said second face image in each photo image, a tracking state of said second face image in each photo image, the number of said photo images said second face image exists, a facial texture of said second face image, and a color feature of a specified part under said second face image, wherein said tracking state includes a continuous tracking state, a lost tracking state or a stop tracking state, wherein if said second face image exists in a specified photo image, said second face image is in said continuous tracking state, wherein if said second face image does not exist in said specified photo image, said second face image is in said lost tracking state, wherein if said second face image does not exist in several consecutive photo images, said second face image is in said stop tracking state.

12. The facial tracking method according to claim 9, wherein during said second facial detecting operation is performed, if a second face image in said subsequent photo image is detected and said face image included in said second tracking frame is said third face image, a comparison process is performed to judge whether said second face image and said third face image or said first face image belong to the same person, wherein said comparison process comprises steps of:
  comparing a position of a second face frame including said second face image with a position of said second tracking frame;
  if said position of said second face frame and said position of said second tracking frame are highly overlapped, confirming that said second face image and said third face image belong to the same person, and updating said third facial data according to a second facial data of said second face image;
  if said position of said second face frame and said position of said second tracking frame are not highly overlapped, calculating a facial texture similarity between said second face image and said third face image and a color feature similarity between a specified part under said second face image and a specified part under said third face image, and calculating a facial texture similarity between said second face image and said first face image and a feature similarity between said specified part under said second face image and a specified part under said first face image;
  if said facial texture similarity and said color feature similarity between said second face image and said third face image and said facial texture similarity and said color feature similarity between said second face image and said first face image are all smaller than a first threshold value, confirming that said second face image and said third face image and said first face image do not belong to the same person, and recording said second facial data of said second face image into said database; and
  if said facial texture similarity and said color feature similarity between said second face image and said third face image or said facial texture similarity and said color feature similarity between said second face image and said first face image are larger than said first threshold value, confirming that said second face image and said third face image or said first face image belong to the same person, and updating said first facial data or said third facial data according to second facial data of said second face image.

13. The facial tracking method according to claim 12, wherein said second facial data comprises a position of said second face image in each photo image, a tracking state of said second face image in each photo image, the number of photo images said second face image exists, a facial texture of said second face image, and a color feature of a specified part under said second face image, wherein said tracking state include a continuous tracking state, a lost tracking state or a stop tracking state, wherein if said second face image exists in a specified photo image, said second face image is in said continuous tracking state, wherein if said second face image does not exist in said specified photo image, said second face image is in said lost tracking state, wherein if said second face image does not exist in several consecutive photo images, said second face image is in said stop tracking state.

14. The facial tracking method according to claim 9, wherein during said second facial detecting operation is performed, if a second face image in said subsequent photo image is detected and no face image is included in said second tracking frame, a comparison process is performed to judge whether said second face image and said first face image belong to the same person, wherein said comparison process comprises steps of:
  calculating a facial texture similarity between said second face image and said first face image and a color feature similarity between a specified part under said second face image and a specified part under said first face image;
  if said facial texture similarity and said color feature similarity between said second face image and said first face image are both smaller than a first threshold value, confirming that said second face image and said first face image do not belong to the same person, and recording a second facial data of said second face image into said database; and
  if said facial texture similarity and said color feature similarity between said second face image and said first face image are both higher than said first threshold value, confirming that said second face image and said first face image belong to the same person, and updating said first facial data according to said second facial data of said second face image.

15. The facial tracking method according to claim 14, wherein said second facial data comprises a position of said second face image in each photo image, a tracking state of said second face image in each photo image, the number of said photo images said second face image exists, a facial texture of said second face image, and a color feature of a specified part under said second face image, wherein said tracking state includes a continuous tracking state, a lost tracking state or a stop tracking state, wherein if said second face image exists in a specified photo image, said second face image is in said continuous tracking state, wherein if said second face image does not exist in said specified photo image, said second face image is in said lost tracking state, wherein if said second face image does not exist in several consecutive photo images, said second face image is in said stop tracking state.

16. The facial tracking method according to claim 14, further comprising a step of performing a facial verification process, wherein said facial verification process comprises steps of:
  if a first condition is satisfied, moving all facial data of said database to a temporary storing zone;
  if a second condition is satisfied, moving a specified facial data of said temporary storing zone to a combination result storing zone;
  calculating a similarity between an additional facial data of said temporary storing zone and said specified facial data, wherein if said similarity is larger than a fourth threshold value, said additional facial data is merged into said specified facial data, wherein if said similarity is smaller than said fourth threshold value, said additional facial data is added to said combination result storing zone; and
  repeatedly acquiring any facial data from the temporary storing zone and comparing said acquired facial data with all facial data of said combination result storing zone until all facial data of said temporary storing zone are merged into or added to said combination result storing zone.

17. The facial tracking method according to claim 16, wherein said first condition indicates that the number of all facial data in said database reaches a fifth threshold value.

18. The facial tracking method according to claim 17, wherein said first condition indicates that a flowchart of detecting and tracking said plural face images is ended and the number of facial data in the database is not zero.

19. The facial tracking method according to claim 16, wherein said second condition indicates that the number of all facial data in said temporary storing zone reaches a fifth threshold value.

20. The facial tracking method according to claim 19, wherein said second condition indicates that a flowchart of detecting and tracking said plural face images is ended and all facial data in said database are moved to said temporary storing zone.

* * * * *